United States Patent
Nainwal et al.

(10) Patent No.: US 11,564,056 B2
(45) Date of Patent: *Jan. 24, 2023

(54) SELECTIVELY HIGHLIGHTING MAP FEATURES ASSOCIATED WITH PLACES

(71) Applicant: Uber Technologies, Inc., San Francisco, CA (US)

(72) Inventors: Satyendra Kumar Nainwal, Palo Alto, CA (US); Daniel Wolf, Menlo Park, CA (US); Kaivalya Bachubhai Parikh, Sunnyvale, CA (US); Ankit Tandon, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,332

(22) Filed: Aug. 3, 2021

(65) Prior Publication Data

US 2021/0368290 A1    Nov. 25, 2021

Related U.S. Application Data

(63) Continuation of application No. 16/867,027, filed on May 5, 2020, now Pat. No. 11,102,608, which is a
(Continued)

(51) Int. Cl.
*H04W 24/00* (2009.01)
*H04W 4/021* (2018.01)
(Continued)

(52) U.S. Cl.
CPC ............ *H04W 4/021* (2013.01); *G06F 16/29* (2019.01); *G06Q 10/02* (2013.01); *G06Q 50/30* (2013.01); *H04W 4/024* (2018.02)

(58) Field of Classification Search
CPC ....... H04W 4/029; H04W 24/02; H04W 4/02; H04W 4/023; H04W 64/006; H04W 8/02;
(Continued)

(56) References Cited

U.S. PATENT DOCUMENTS 7,617,136 B1    11/2009  Lessing et al.
7,660,666 B2 *  2/2010   Finn ........................ G06F 16/29
                                                              701/533
(Continued)

FOREIGN PATENT DOCUMENTS

EP         3293684 A1       3/2018
WO    WO-2020056240 A1      3/2020

OTHER PUBLICATIONS

"U.S. Appl. No. 16/569,541, Non Final Office Action dated Apr. 2, 2020", 16 pgs.
(Continued)

*Primary Examiner* — Joseph Arevalo
(74) *Attorney, Agent, or Firm* — Schwegman Lundberg & Woessner, P.A.

(57) ABSTRACT

Systems and methods of providing a user interface in which map features associated with places are selectively highlighted are disclosed herein. In some example embodiments, a computer system receives a request for a transportation service associated with a place, retrieves an entrance geographic location for the place from a database, with the entrance geographic location being stored in association with the place in the database and representing an entrance for accessing the place, generating route information based on the retrieved entrance geographic location, with the route information indicating a route from an origin geographic location of a computing device of a user to the entrance geographic location of the place, and causing the generated
(Continued)

route information to be displayed within a user interface on a computing device of the user.

17 Claims, 25 Drawing Sheets

Related U.S. Application Data

(63) continuation of application No. 16/569,541, filed on Sep. 12, 2019, now Pat. No. 10,848,905.

(60) Provisional application No. 62/731,040, filed on Sep. 13, 2018.

(51) Int. Cl.
*H04W 4/024* (2018.01)
*G06F 16/29* (2019.01)
*G06Q 10/02* (2012.01)
*G06Q 50/30* (2012.01)

(58) Field of Classification Search
CPC ..... H04W 88/08; H04W 4/024; H04W 16/18; H04W 48/04; H04W 12/06; H04W 40/246; H04W 48/10; H04W 4/21; H04W 64/003; H04W 12/08; H04W 24/00; H04W 48/14; H04W 48/16; H04W 48/20; H04W 64/00; H04W 4/021; H04W 76/50; H04W 12/00503; H04W 16/28; H04W 24/10; H04W 4/33; H04W 74/04; H04W 84/045; H04W 8/22; H04W 12/003; H04W 12/12; H04W 16/10; H04W 16/24; H04W 24/08; H04W 28/0236; H04W 28/04; H04W 28/16; H04W 4/12; H04W 4/20; H04W 4/70; H04W 4/90; H04W 52/241; H04W 72/04; H04W 74/085; H04W 84/042; H04W 84/12; H04W 88/16; H04W 8/005; H04W 8/26
USPC ... 455/465, 422.1, 449, 414.3, 456.1, 414.2, 455/457, 461, 431, 414.1, 456.3, 519, 455/518, 455, 436, 522
See application file for complete search history.

(56) References Cited

U.S. PATENT DOCUMENTS

| | | | |
|---|---|---|---|
| 9,075,136 B1* | 7/2015 | Joao | G08G 1/04 |
| 9,936,346 B2 | 4/2018 | Koukoumidis et al. | |
| 10,126,138 B1 | 11/2018 | Farmer et al. | |
| 10,848,905 B2 | 11/2020 | Nainwal et al. | |
| 11,102,608 B2 | 8/2021 | Nainwal et al. | |
| 2009/0172035 A1 | 7/2009 | Lessing et al. | |
| 2009/0276250 A1 | 11/2009 | King et al. | |
| 2010/0087190 A1 | 4/2010 | Pandit et al. | |
| 2011/0290875 A1 | 12/2011 | Wengrovitz | |
| 2015/0163630 A1 | 6/2015 | Hughes, Jr. et al. | |
| 2015/0317683 A1 | 11/2015 | Yerli | |
| 2016/0034828 A1 | 2/2016 | Sarawgi et al. | |
| 2017/0161979 A1 | 6/2017 | Schmidt-lackner et al. | |
| 2017/0365029 A1 | 12/2017 | Kim | |
| 2018/0058863 A1 | 3/2018 | Meyer et al. | |
| 2018/0067620 A1 | 3/2018 | Adler et al. | |
| 2018/0281948 A1 | 10/2018 | Tao et al. | |
| 2018/0285782 A1 | 10/2018 | Costas et al. | |
| 2019/0137292 A1 | 5/2019 | Eno | |
| 2019/0186946 A1 | 6/2019 | Liu | |
| 2019/0392545 A1* | 12/2019 | Wei | H04W 4/024 |
| 2020/0092672 A1 | 3/2020 | Nainwal et al. | |
| 2020/0267499 A1 | 8/2020 | Nainwal et al. | |

OTHER PUBLICATIONS

"U.S. Appl. No. 16/569,541, Notice of Allowance dated Jul. 21, 2020", 8 pgs.
"U.S. Appl. No. 16/569,541, Response filed Jul. 2, 2020 to Non Final Office Action dated Apr. 2, 2020", 14 pgs.
"U.S. Appl. No. 16/867,027, Final Office Action dated Dec. 1, 2020", 20 pgs.
"U.S. Appl. No. 16/867,027, Non Final Office Action dated Jun. 17, 2020", 19 pgs.
"U.S. Appl. No. 16/867,027, Notice of Allowance dated Apr. 21, 2021", 12 pgs.
"U.S. Appl. No. 16/867,027, Response filed Mar. 31, 2021 to Final Office Action dated Dec. 1, 2020", 11 pgs.
"U.S. Appl. No. 16/867,027, Response filed Sep. 17, 2020 to Non Final Office Action dated Jun. 17, 2020", 12 pgs.
"Application Serial No. PCT/US2019/050989, Written Opinion of the International Preliminary Examining Authority dated Sep. 24, 2020", 6 pgs.
"International Application Serial No. PCT/US2019/050989, International Preliminary Report on Patentability dated Jan. 13, 2021", 7 pgs.
"International Application Serial No. PCT/US2019/050989, International Search Report dated Nov. 25, 2019", 4 pgs.
"International Application Serial No. PCT/US2019/050989, Written Opinion dated Nov. 25, 2019", 7 pgs.
"Canadian Application Serial No. 3,112,769, Non Final Office Action dated Mar. 22, 2022", 6 pgs.
"Australian Application Serial No. 2019337668, First Examination Report dated Apr. 6, 2022", 3 pgs.
U.S. Appl. No. 16/569,541, U.S. Pat. No. 10,848,905, filed Sep. 12, 2019, Selectively Highlighting Map Features Associated With Places.
U.S. Appl. No. 16/867,027, filed May 5, 2020, Selectively Highlighting Map Features Associated With Places.
"Canadian Application Serial No. 3,112,769, Response filed Jul. 18, 2022 to Non Final Office Action dated Mar. 22, 2022", 162 pgs.
"Australian Application Serial No. 2019337668, Response filed Oct. 10, 2022 to First Examination Report dated Apr. 6, 2022", 71 pgs.
"Australian Application Serial No. 2019337668, Subsequent Examiners Report dated Nov. 7, 2022", 4 pgs.

\* cited by examiner

| PLACE | ROOFTOP LOCATION | ENTRANCE(S) | PARKING | SUB-UNIT OF |
|---|---|---|---|---|
| ACME CORP. | ROOFTOP LOCATION A (E.G., GEOCODE) | ENTRANCE LOCATION A (E.G., GEOCODE) | PARKING LOCATION A (E.G., GEOCODE) | METROPOLIS MALL |
| | | | . . . | |
| METROPOLIS MALL | ROOFTOP LOCATION B (E.G., GEOCODE) | ENTRANCE LOCATION B (E.G., GEOCODE) | PARKING LOCATION B (E.G., GEOCODE) | N/A |
| | | | . . . | |
| . . . | . . . | . . . | . . . | . . . |

SELECTIVELY HIGHLIGHTING MAP FEATURES ASSOCIATED WITH PLACES

CROSS-REFERENCE TO RELATED APPLICATIONS

This application is a continuation of and claims the benefit of priority of U.S. application Ser. No. 16/867,027, filed May 5, 2020, which is a continuation of and claims the benefit of priority of U.S. application Ser. No. 16/569,541, filed Sep. 12, 2019, which claims the benefit of priority, under 35 U.S.C. Section 119(e), to U.S. Provisional Application No. 62/731,040, filed on Sep. 13, 2018, entitled, "SELECTIVELY HIGHLIGHTING MAP FEATURES ASSOCIATED WITH PLACES," each of which are hereby incorporated by reference in their entireties as if set forth herein.

TECHNICAL FIELD

Embodiments of the present disclosure relate generally to the technical field of geographic positioning for a networked computer system and, more particularly, but not by way of limitation, to systems and methods of providing a user interface in which map features associated with places are selectively highlighted.

BACKGROUND

A networked computer system can receive, from user devices, a request for a service. The request can include data related to a place that is to be involved in the providing of the service. For example, a user may submit a request, via the networked computer system, to be transported from a first place to a second place or to have one or more items (e.g., food or other products) delivered from a first place to a second place. The networked computer system may then transmit a geographical location of the first place and a geographical location of the second place to a device of a service provider for use in providing the service to the requester. However, although a request may include an address or a name of a place for which an address can be determined, the address of a place often does not accurately represent the precise location where the service should be provided. Additionally, the user interface used to present the geographical location lacks useful features that enable a user to navigate to the geographical location in a precise and efficient way.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 2 illustrates a mapping of corresponding feature data for different places stored in a database, in accordance with some example embodiments.

DETAILED DESCRIPTION

Figure 1:
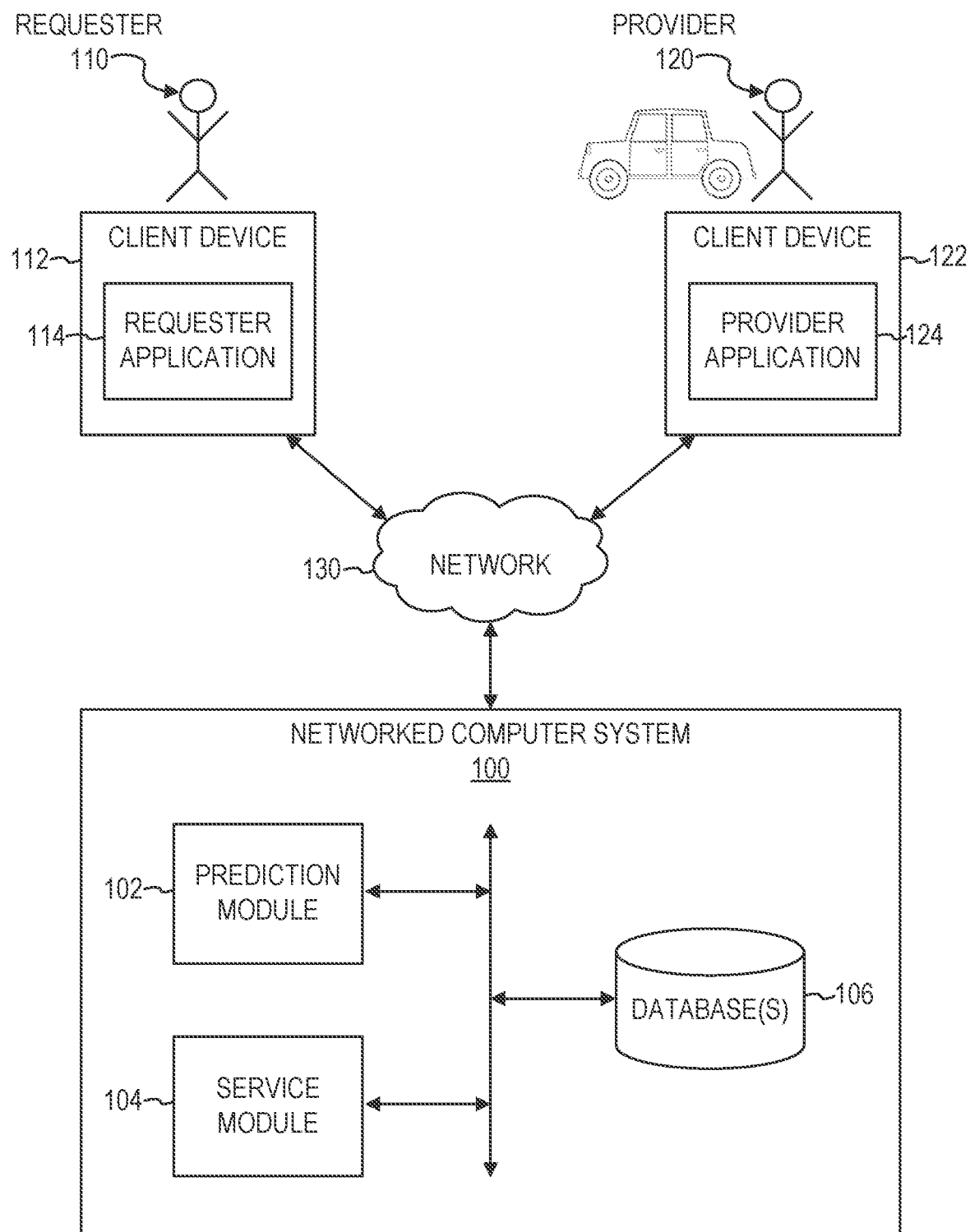
FIG. 1 is a block diagram of a system environment for a networked computer system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for improving a user interface to provide more precise and more efficient navigation guidance while a user is navigating to a place. Additionally, other technical effects will be apparent from this disclosure as well.

In some example embodiments, operations are performed by a computer system (or other machine) having a memory and at least one hardware processor, with the operations comprising: receiving a request for a transportation service associated with a place; retrieving an entrance geographic location for the place from a database, the entrance geographic location being stored in association with the place in the database, and the entrance geographic location representing an entrance for accessing the place; generating route information based on the retrieved entrance geographic location, the route information indicating a route from an origin geographic location of a computing device of a user to the entrance geographic location of the place; and causing the generated route information to be displayed within a user interface on a computing device of the user. In some example embodiments, the transportation service comprises delivering one or more items to or from the place.

In some example embodiments, the operations further comprise: detecting that a current geographic location of the computing device of the user is within a predetermined distance of the entrance geographic location of the place; and causing a visual representation of a structure within which the place is located to be highlighted within the user interface of the computing device in response to the detecting that the current geographic location of the computing device of the user is within a predetermined distance of the entrance geographic location. In some example embodiments, the causing the visual representation of the structure to be highlighted comprises applying a visual effect to an outline of the structure.

In some example embodiments, the operations further comprise: detecting that a current geographic location of the computing device of the user is within a predetermined distance of the entrance geographic location of the place; and causing a visual representation of at least one parking geographic location to be highlighted within the user interface of the computing device in response to the detecting that the current geographic location of the computing device of the user is within a predetermined distance of the entrance geographic location, the at least one parking geographic location being retrieved from the database and stored in association with the place in the database, and the at least one parking geographic location representing an area for parking a vehicle.

In some example embodiments, the operations further comprise: detecting that a current geographic location of the computing device of the user is within a predetermined distance of the entrance geographic location of the place; and causing a visual representation of the entrance to be highlighted within the user interface of the computing device in response to the detecting that the current geographic location of the computing device of the user is within a predetermined distance of the entrance geographic location. In some example embodiments, the causing the visual representation of the entrance to be highlighted comprises applying a visual effect to the entrance. In some example embodiments, the causing the visual representation of the entrance to be highlighted comprises displaying an identifying label in association with the visual representation of the entrance within the user interface.

In some example embodiments, the place is a sub-unit of another place, and the operations further comprise: detecting that a current geographic location of the computing device of the user is within a predetermined distance of the entrance geographic location of the place; and causing a visual representation of a rooftop geographic location of the place to be highlighted within the user interface of the computing device in response to the detecting that the current geographic location of the computing device of the user is within a predetermined distance of the entrance geographic location, the rooftop geographic location of the place representing a specific geographic location of the place within the other place. In some example embodiments, the causing the visual representation of the rooftop geographic location to be highlighted comprises displaying an identifying label in association with the visual representation of the rooftop geographic location within the user interface.

In some example embodiments, the operations further comprise: detecting that a current geographic location of the computing device of the user is within a predetermined distance of the entrance geographic location of the place; and causing a visual representation of a path from an end of the route to the entrance to be displayed within the user interface of the computing device in response to the detecting that the current geographic location of the computing device of the user is within a predetermined distance of the entrance geographic location.

In some example embodiments, the operations further comprise: detecting that a current geographic location of the computing device of the user is within a predetermined distance of the entrance geographic location of the place; and causing one or more instructions for walking to the place to be displayed within the user interface of the computing device in response to the detecting that the current geographic location of the computing device of the user is within a predetermined distance of the entrance geographic location.

In some example embodiments, the operations further comprise: detecting that a current geographic location of the computing device of the user is within a predetermined distance of the entrance geographic location of the place; and causing at least one photographic image of the place to be displayed within the user interface of the computing device in response to the detecting that the current geographic location of the computing device of the user is within a predetermined distance of the entrance geographic location.

In some example embodiments, the operations further comprise: accessing corresponding sensor data for each one of a plurality of other requests for the transportation service associated with the place, the corresponding sensor data for each one of the plurality of other requests indicating a corresponding path of a mobile device of a corresponding provider of the transportation service for the one of the plurality of other requests; determining the entrance geographic location for the place based on the sensor data for the plurality of other requests for the transportation service associated with the place; and storing the entrance geographic location for the place in association with the place in the database.

In some example embodiments, the operations further comprise: accessing corresponding sensor data for each one of a plurality of other requests for the transportation service associated with the place, the corresponding sensor data for each one of the plurality of other requests indicating a corresponding path of a mobile device of a corresponding provider of the transportation service for the one of the plurality of other requests; determining the at least one parking geographic location for the place based on the sensor data for the plurality of other requests for the transportation service associated with the place; and storing the at least one parking geographic location for the place in association with the place in the database.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a block diagram of a system environment for a networked computer system 100, in accordance with some example embodiments. In some example embodiments, the networked computer system 100 coordinates the transportation of persons and/or goods/items for a service requester 110 (e.g., such as a rider) by a service provider 120 (e.g., a driver of a vehicle). The provider 120 uses a vehicle to provide the transportation to the requester 110.

In some example embodiments, the networked computer system 100 comprises any combination of one or more of a prediction module 102, a service module 104, and one or more databases 106. These modules and databases are not native components of a generic computer system, and provide structures and functions beyond generic functions of a computer system, as further described below.

In some example embodiments, the modules 102 and 104 and the database(s) 106 reside on a machine having a memory and at least one processor (not shown). In some example embodiments, the modules 102 and 104 and the database(s) 106 reside on the same machine, while in other example embodiments, one or more of the modules 102 and 104 and the database(s) 106 reside on separate remote machines that communicate with each other via a network (e.g., network 130). It is contemplated that other configurations are also within the scope of the present disclosure.

In some example embodiments, the requester 110 operates a client device 112 that executes a requester application 114 that communicates with the networked computer system 100. The requester 110 operates the requester application 114 to view information about the networked computer system 100, and to make a request for service from the networked computer system 100 for a delivery or transport service ("a trip") of the requester 110 (and, optionally, additional persons) and/or items, for example cargo needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, e.g., a global positioning system (GPS) component, a wireless networking system, or a combination thereof. For purposes of simplicity, as described herein, an origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends a pick-up location to the requester 110 based on historical trip or service data associated with the origin location.

According to examples herein, the requester client device 112 can transmit a set of data to the networked computer system 100 over a network 130 in response to requester input or operation of the requester application 114. Such data can be indicative of the requester's interest in potentially requesting service (e.g., before actually confirming or requesting the service). For example, the requester 110 may launch the requester application 114 and specify an origin location and/or a destination location to view information about the networked computer system 100 before making a decision on whether to request service. The requester 110 may want to view information about the average or estimated time of arrival for pick-up by the provider 120, the estimated time to the destination, the price, the available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 can generate and transmit the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi® network or WiMax® network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a service via the requester application 114, the requester application 114 can generate data corresponding to a request for the service through the networked computer system 100 (e.g., also referred to herein as a "trip request"). Responsive to receiving a trip request, the networked computer system 100 determines the average estimated time of arrival (ETA) at the pick-up location of providers 120 whose current location is within a threshold distance of the pick-up location (e.g., providers 120 who are all within one mile of the pickup location). In some embodiments, responsive to determining that requester's ETA is within a threshold amount of time of the average ETA of nearby available providers 120, the networked computer system 100 uses information from the trip request to match the requester 110 with an available provider 120. Depending on implementation, the trip request can include requester or device information (e.g., a requester identifier, a device identifier), a service type (e.g., vehicle type) and/or selected service option (such as described herein), an origin location, a destination location, a payment profile identifier, a desired departure time, and/or other data. The networked computer system 100 selects a provider 120 from a set of providers, such as based on the provider's current location and status (e.g., offline, online, available, etc.) and/or information from the trip request (e.g., service type, origin location, and/or destination location), to provide the service for the requester and transport the requester 110 from the origin location to the destination location. Responsive to selecting an available provider 120, the networked computer system 100 sends an invitation message to the provider client device 122 inviting the provider 120 to fulfill the trip request.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA.

If, after matching the requester 110 with an available provider 120, the networked computer system 100 determines that the requester's ETA and the provider's ETA at the pick-up location vary by over a threshold amount of time, the networked computer system 100 can reassign the trip to another available provider 120.

The provider 120 operates a client device 122 executing a provider application 124 that communicates with the networked computer system 100 to provide information indicating whether the provider 120 is available or unavailable to provide transportation services to requesters 110. The provider application 124 can also present information about the networked computer system 100 to the provider 120, such as invitations to provide service, navigation instructions, map data, etc. In one example embodiment, the provider application 124 enables the provider 120 to provide information regarding availability of the provider 120 by logging into the networked computer system 100 and activating a setting indicating that they are currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, e.g., a GPS component, a wireless networking system, or a combination thereof. The provider application 124 further allows a provider 120 to receive, from the networked computer system 100, an invitation message to provide a service for a requesting requester 110, and if the provider 120 accepts via input, the provider application 124 can transmit an acceptance message to the networked computer system 100. The networked computer system 100 can subsequently provide information about the provider 120 to the requester application 114. In another example embodiment, the provider application 124 can enable the provider 120 to view a list of current trip requests and to select a particular trip request to fulfill. The provider application 124 can also receive routing information from the networked computer system 100.

In some example embodiments, the requester client device 112 and provider client device 122 are portable or mobile electronic devices such as smartphones, tablet devices, wearable computing devices (e.g., smartwatches) or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDP A, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, can present information received from the networked computer system 100 on a requester interface, such as a map of the geographic region, and the current location of the requester client device 112 or the provider client device 122. The applications 114 and 124 running on the requester client device 112 and the provider client device 122 can determine the current location of the respective device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update the database(s) 106 with the availability status. The networked computer system 100 is also configured to receive trip requests from the requester application 114 and creates corresponding trip records in the database(s) 106. According to an example embodiment, a trip record corresponding to a trip request can include or be associated with a trip ID, a requester ID, an origin location, a destination location, a service type, pricing information, and/or a status indicating that the corresponding trip request has not been processed. According to one example embodiment, when a provider 120 accepts the invitation message to service the trip request for the requester 110, the trip record can be updated with the provider's information as well as the provider's location and the time when the trip request was accepted. Similarly, location and time information about the service as well as the cost for the service can be associated with the trip record.

In one example embodiment, during the trip, the networked computer system 100 receives information (e.g., periodically) from the provider application 124 indicating the location of the provider's vehicle and/or telematics information (e.g., indications of current speed, acceleration/deceleration, events, stops, and so forth). The networked computer system 100 stores the information in the database(s) 106 and can associate the information with the trip record. In some example embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a trip request through the requester application 114. In one example embodiment, the requester application 114 periodically transmits geospatial location information of the requester client device 112 to the networked computer system 100. The geospatial location information can correspond to a current location data point of the requester client device 112 at an instance in time. Such a location data point can be generated by a location determination module (not shown) in the requester client device 112, e.g., a GPS component, a wireless networking system, or a combination thereof.

In some example embodiments, the requester application 114 and the provider application 124 are configured to display map data indicating a specific geographical location of a place, as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 may display, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off a requester 110 associated with the service request, as well as a route from the current location of the provider 120 or the client device 122 of the provider 120 to the specific geographical location of the place associated with the service request. Similarly, the requester application 114 may display, on the client device 112 of the requester 110, a map that includes a graphic element that corresponds to the current location of the requester 110 or the client device 112 of the requester 110 and a graphic element that corresponds to the specific geographical location of the place associated with the service request, as well as a route from the current location of the requester 110 or the client device 112 of the requester 110 to the specific geographical location of the place associated with the service request.

The map data and the navigation instructions are generated based on the specific geographical location of the place associated with the service request. In some example embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 106, and then transmit the geographical location of the place to the requester application 114 and the provider application 124 for use in generating the corresponding map data and navigation instructions that are to be generated and displayed by the requester application 114 and the provider application 124. In other example embodiments, the corresponding map data and navigation instructions are generated by the networked computer system 100 using the geographical location of the place stored in the database(s) 106 of the networked computer system 100 in association with an identifier of the place (e.g., a name of the place, an address of the place), and then transmitted to the requester application 114 and the provider application 124 for display on client device 112 of the requester 110 and the client device 122 of the provider 120.

In some example embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

In some example embodiments, the prediction module 102 is configured to determine and store feature data for a place to which a user (e.g., the provider 120) may wish to navigate (e.g., in servicing a request to transport a person or an item to or from the place). The stored feature data for the place is then available for use in providing navigation guidance to the user in association with a servicing of a request. FIG. 2 illustrates a mapping 200 of corresponding feature data for different places stored in a database, in accordance with some example embodiments. In some example embodiments, the feature data for a place comprises any combination of one or more of a rooftop geographic location representing the actual location of the place, one or more entrance geographic locations representing an entrance for accessing the place, and one or more parking geographic locations representing an area for parking a vehicle.

In some example embodiments, the prediction module 102 is configured to determine the feature data of the place based on historical sensor data corresponding to requests for transportation service associated with the place. The historical sensor data comprises data that indicates locations of a computing device (e.g., a mobile device) using one or more sensors of the computing device (e.g., GPS data). The locations indicated by the sensor data correspond to a time period during which a user of the computing device was performing the transportation service (e.g., when the provider 120 was transporting food to the place as part of a food delivery service). In some example embodiments, the sensor data for each request indicates a corresponding path traveled by the computing device of the user during the servicing of the corresponding request. The prediction module 102 may analyze the sensor data to identify geographic locations that qualify as entrances and parking areas.

The prediction module 102 may identify an entrance geographic location for the place based on an identification of a common location or averaged location at which users walked from a vehicle to the place. Since multiple users are likely to enter a place at the same entrance as each other, the prediction module 102 may identify the entrance geographic location of the place by identifying this location of commonality. In some example embodiments, the prediction module 102 accesses corresponding sensor data for each one of a plurality of requests for the transportation service associated with the place, determines the entrance geographic location for the place based on the sensor data for the plurality of other requests for the transportation service associated with the place, and stores the entrance geographic location for the place in association with the place in the database.

The prediction module 102 may also identify a parking geographic location for the place based on an identification of a common location at which a vehicle of the user remained in the same location for at least a predetermined amount of time. The prediction module 102 may interpret sensor data indicating that a vehicle remained in the same location for an extended period of time (e.g., at least a few minutes) as an indication that the vehicle was parked in a parking spot for the place. In some example embodiments, the prediction module 102 accesses corresponding sensor data for each one of a plurality of requests for the transportation service associated with the place, determines at least one parking geographic location for the place based on the sensor data for the plurality of requests for the transportation service associated with the place, and stores the parking geographic location(s) for the place in association with the place in the database.

As seen in FIG. 2, in some example embodiments, the feature data in the mapping 200 also comprises an indication that the place is a sub-unit of another place. For example, the feature data may comprise an indication that a particular store is a sub-unit (e.g., located within the building structure of) a shopping mall. By identifying the place as a sub-unit of another place in the database, the prediction module 102 can associate the place with the feature data of the other place, which may then be used in providing navigation guidance to the sub-unit place. In one example, a first place (e.g., "ACME CORP." in FIG. 2) is a sub-unit and located within the physical boundary of a second place (e.g., "METROPOLIS MALL" in FIG. 2). Although the first place has its own entrance (e.g., "ENTRANCE LOCATION A" in FIG. 2) through which a user enters the first place directly, an entrance to the second place (e.g., "ENTRANCE LOCATION B" in FIG. 2) is also useful in providing navigation guidance to the first place. Similarly, a parking geographic location for the second place is also useful in providing navigation guidance to the first place. Therefore, in some example embodiments, the prediction module 102 stores the feature data of the second place in association with the first place as well, such that the feature data of the second place acts as feature data of the first place for use in providing navigation guidance for the first place.

In some example embodiments, the service module 104 is configured to receive a request for a transportation service associated with a place. In some example embodiments, the transportation service comprises delivering one or more items to or from the place. However, it is contemplated that other types of transportation services are also within the scope of the present disclosure. In some example embodiments, the service module 104 is configured to retrieve an entrance geographic location for the place from a database and generate route information based on the retrieved entrance geographic location in response to, or otherwise based on, the receiving of the request. In some example embodiments, the route information indicates a route from an origin geographic location of a computing device of a user to the entrance geographic location of the place. In some example embodiments, the service module 104 causes the generated route information to be displayed within a user interface on the computing device of the user.

Figure 3:
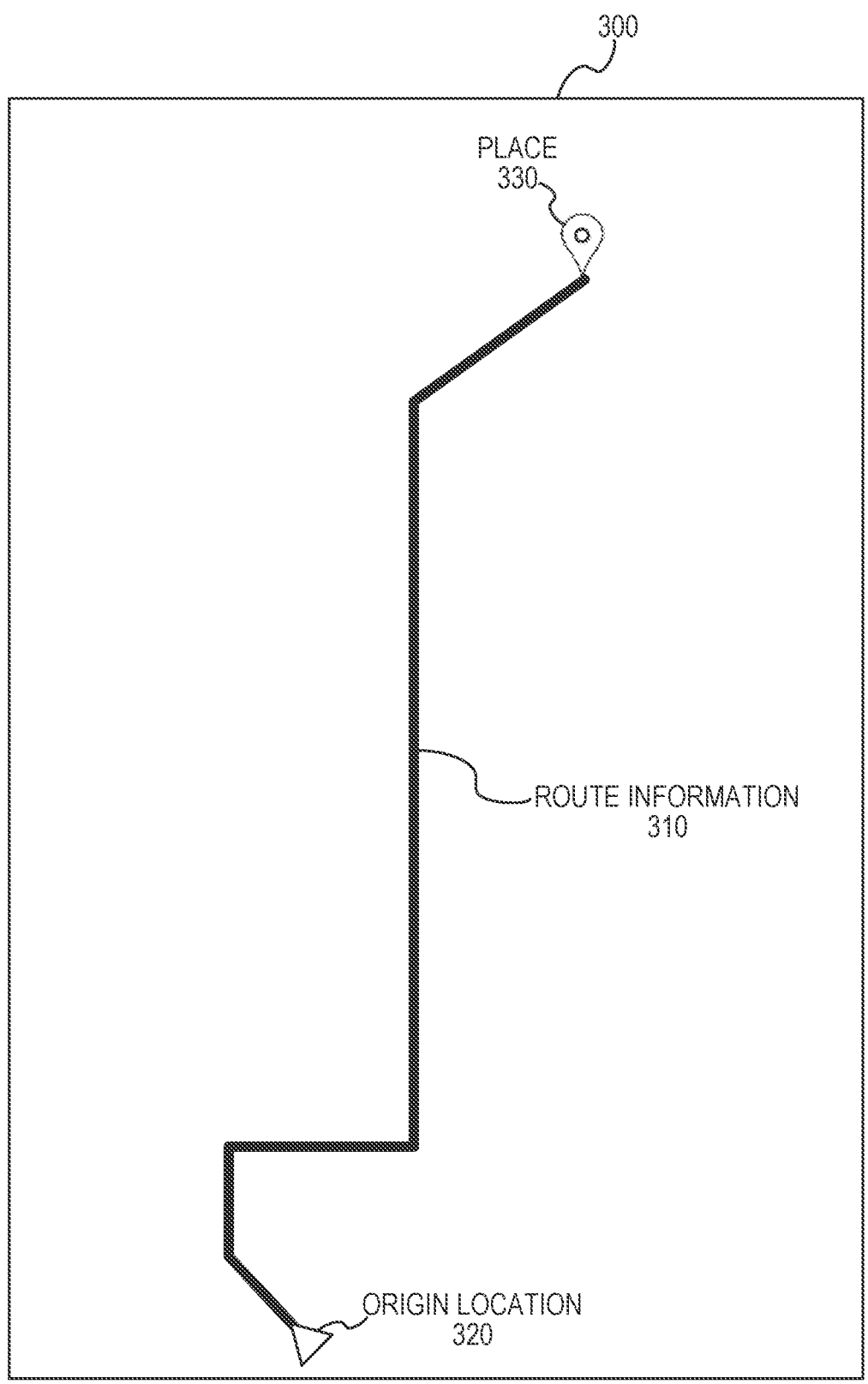
FIG. 3 illustrates a graphical user interface (GUI) in which route information indicating a route from an origin location to an entrance geographic location of a place is displayed, in accordance with some example embodiments.
Figure 4:
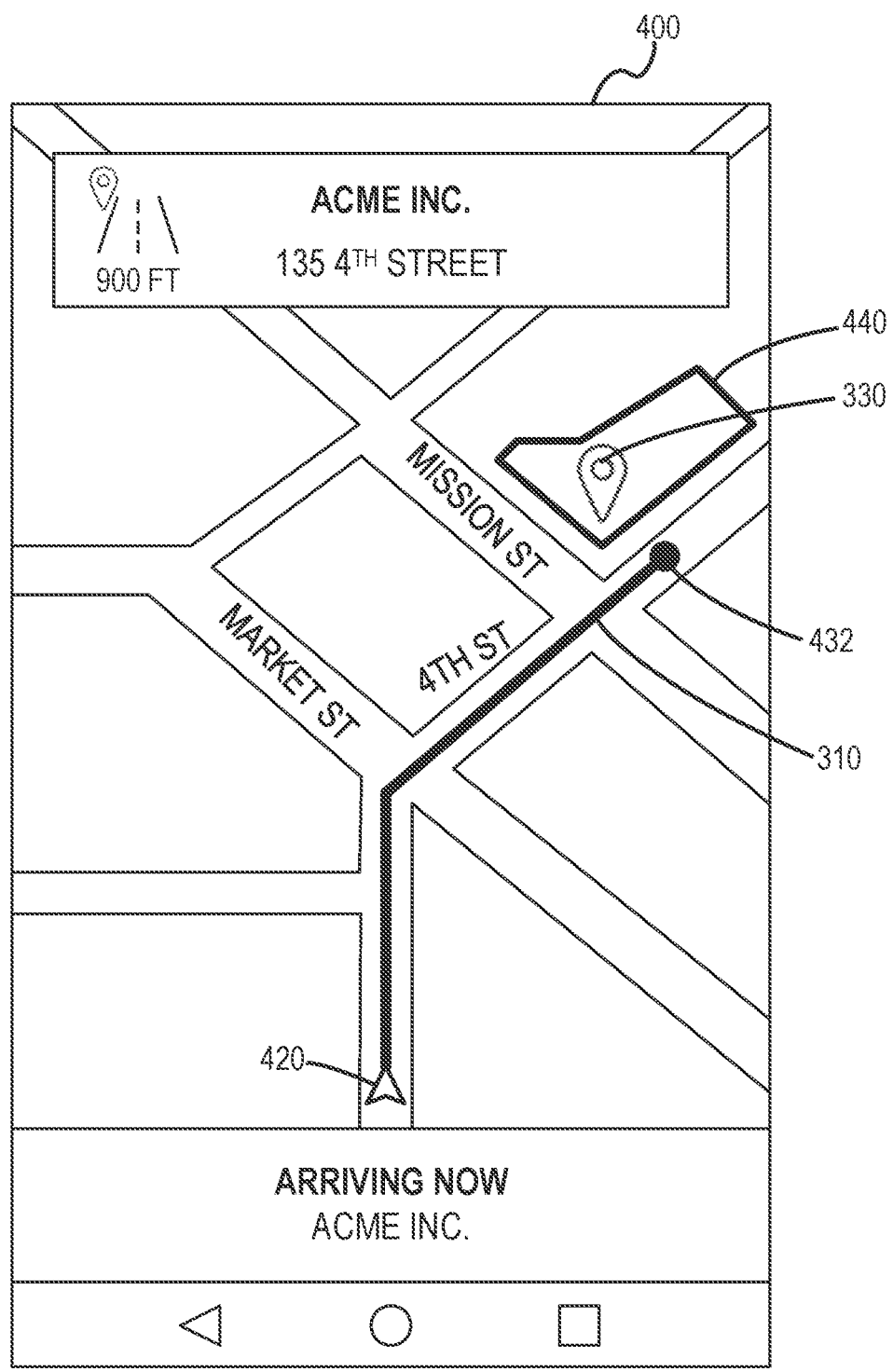
FIG. 4 illustrates a GUI in which a visual representation of a structure within which the place is located is highlighted, in accordance with some example embodiments.

FIG. 3 illustrates a GUI 300 in which route information 310 indicating a route from an origin location 320 to an entrance geographic location of a place 330 is displayed, in accordance with some example embodiments. In some example embodiments, the service module 104 updates the route information 310 and other navigation guidance information as the location of the computing device changes. For example, as shown in FIG. 4, as the computing device moves towards the place 330 (e.g., as the user drives towards the place 330), the current location 420 of the computing device of the user is visually displayed, and feature data of the place 330 is used to provide helpful navigation guidance to the user. FIG. 4 illustrates a GUI 400 in which a visual representation of a structure within which the place is located is highlighted, in accordance with some example embodiments.

In some example embodiments, the service module 104 is configured to detect that the current geographic location 420 of the computing device of the user is within a predetermined distance (e.g., within 1000 feet) of the entrance geographic location of the place 330, and to cause a visual representation of a structure within which the place is located to be highlighted in response to the detecting that the current geographic location 420 of the computing device of the user is within the predetermined distance of the entrance geographic location. In some example embodiments, the causing the visual representation of the structure to be highlighted comprises applying a visual effect to an outline 440 of the structure, such as by displaying the outline 440 of the structure as being distinctly bolder or a different color than the outline of other structures displayed within the GUI 400. In some example embodiments, the service module 104 displays a visual representation of an end of the route 432 to the entrance geographic location of the place 330.

Figure 5:
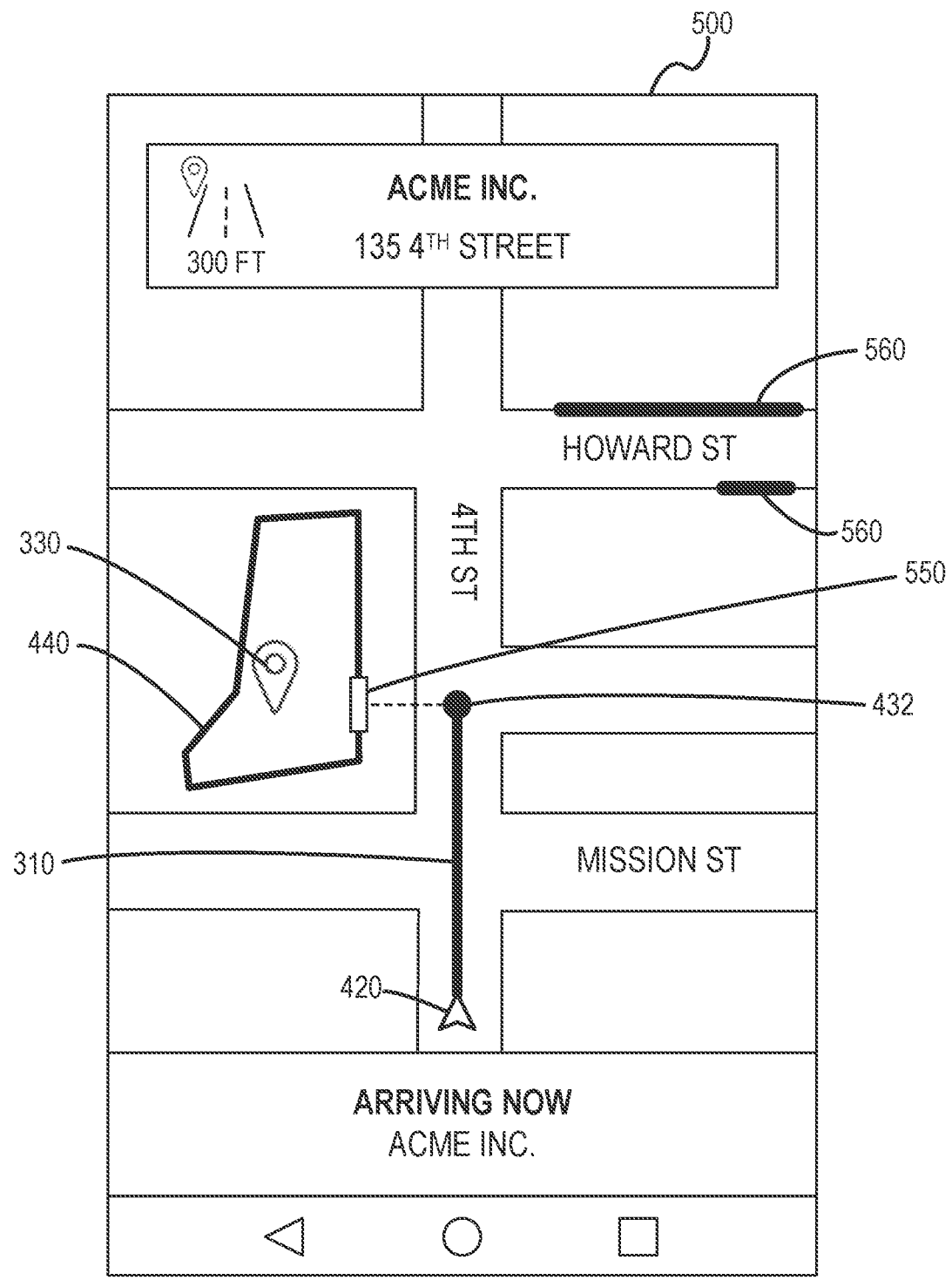
FIG. 5 illustrates a GUI in which the visual representation of the entrance for the place and visual representations of parking locations for the place are highlighted, in accordance with some example embodiments.

FIG. 5 illustrates a GUI 500 in which the visual representation of the entrance 550 for the place 330 and visual representations of parking locations 550 for the place 330 are highlighted, in accordance with some example embodiments. In some example embodiments, the service module 104 is configured to detect that the current geographic location 420 of the computing device of the user is within another predetermined distance (e.g., within 400 feet) of the entrance geographic location of the place 330, and to cause a visual representation of at least one parking geographic location 550 to be highlighted in response to the detecting that the current geographic location 420 of the computing device of the user is within the other predetermined distance of the entrance geographic location. The parking geographic locations are retrieved from the database. In some example embodiments, the causing the visual representation of at least one parking geographic location 550 to be highlighted comprises applying a visual effect to the visual representation of the at least one parking geographic location 550, such as by displaying the at least one parking geographic location 550 as being distinctly bolder or a different color than other adjacent map features displayed within the GUI 500.

In some example embodiments, parking geographic locations are stored and accessed based on time data indicating one or more of the day of the week and the time of day. For example, one parking geographic location may be stored for a place for weekdays between 9 am and 5 pm, while another parking geographic location for the place may be stored for weekdays between 5 pm and midnight, while yet another parking geographic location for the place may be stored for all day on the weekends. When the service module 104 is retrieving the parking geographic location to use in providing route guidance for a place, the service module 104 may use the day and/or time of day at which arrival is expected at the place to look up the corresponding parking geographic location in the database, and then use that corresponding parking geographic location in the route guidance for the place.

In some example embodiments, each parking geographic location for a place has a corresponding likelihood of availability for different days and different time periods that is stored in association with the parking geographic location for that particular day and time period. The likelihood of availability may comprise a numerical value or some other type of value that represents the likelihood that the parking geographic location will be available for use at the corresponding day and time. The likelihood of availability may be calculated based on a percentage of service trips associated with the place that have used that particular parking geographic location within the particular time period (e.g., 75% of the total trips to the place between 1 pm-2 pm on Mondays use the parking geographic location). In some example embodiments, the service module 104 is configured to use the likelihood of availability for a parking geographic location in highlighting that parking geographic location.

In some example embodiments, the service module 104 highlights the visual representation of the parking geographic location in different ways depending on the likelihood of availability for the parking geographic location. For example, the service module 104 may use different colors, different numbers, or different alphabetical grades as visual effects on the visual representation of the parking geographic location (e.g., such as by overlaying the colors, numbers, or alphabetical grades on the visual representation of the parking geographic location). In one example, the service module 104 highlights the visual representation of the parking geographic location in green if the likelihood of availability is high (e.g., above 75%), highlights the visual representation of the parking geographic location in yellow if the likelihood of availability is medium (e.g., between 25% and 75%), and highlights the visual representation of the parking geographic location in red if the likelihood of availability is low (e.g., below 25%). In another example, the service module 104 overlays the visual representation of the parking geographic location with a grade of "A" if the likelihood of availability is high (e.g., above 75%), highlights the visual representation of the parking geographic location with a grade of "B" if the likelihood of availability is medium (e.g., between 25% and 75%), and highlights the visual representation of the parking geographic location with a grade of "C" if the likelihood of availability is low (e.g., below 25%). In yet another example, the service module 104 simply overlays the visual representation of the parking geographic location with the numerical likelihood of availability (e.g., "78%" or "78"). Other ways of highlighting the visual representation of the parking geographic location are also within the scope of the present disclosure.

Figure 6:
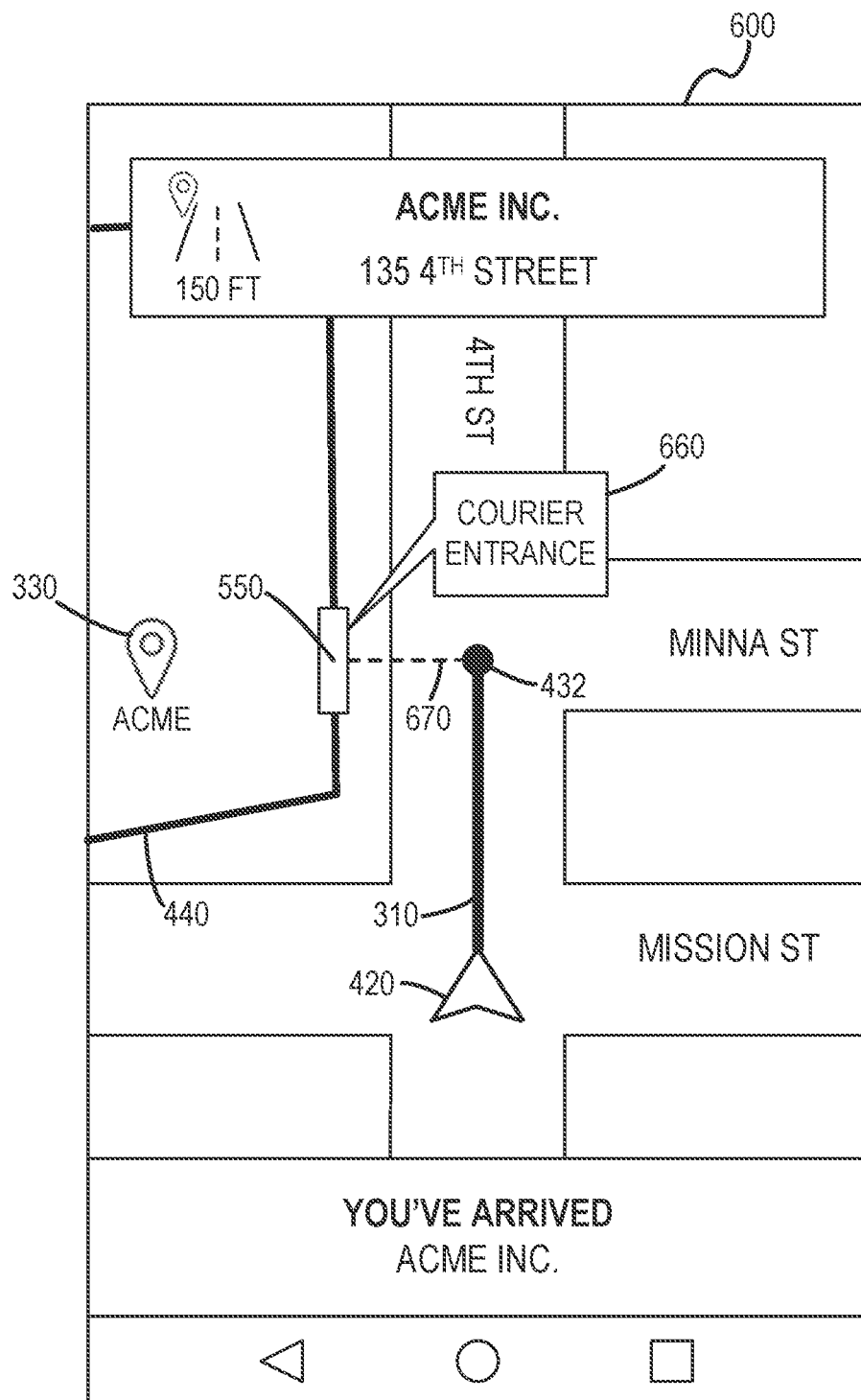
FIG. 6 illustrates a GUI in which the entrance for the place is identified with a label and a visual representations of a path from an end of the route to the entrance of the place is displayed, in accordance with some example embodiments.

FIG. 6 illustrates a GUI 600 in which the entrance 550 for the place 330 is identified with a label 660 and a visual representation of a path 670 from the end of the route 432 to the entrance 550 of the place 330 is displayed, in accordance with some example embodiments. In some example embodiments, the service module 104 is configured to detect that the current geographic location 420 of the computing device of the user is within yet another predetermined distance (e.g., within 200 feet) of the entrance geographic location of the place 330, and to cause the visual representation of the entrance 550 to be highlighted in response to the detecting that the current geographic location 420 of the computing device of the user is within the other predetermined distance of the entrance geographic location. In some example embodiments, the causing the visual representation of the entrance 550 to be highlighted comprises applying a visual effect to the entrance, such as displaying the visual representation of the entrance 550 as being bolder or a different color than adjacent surfaces of the same building structure. In some example embodiments, the causing the visual representation of the entrance 550 to be highlighted comprises displaying an identifying label 660 in association with the visual representation of the entrance 550 within the user interface.

In some example embodiments, the service module 104 is configured to cause a visual representation of a path 670 from an end of the route 432 to the entrance 550 to be displayed in response to the detecting that the current geographic location 420 of the computing device of the user is within the other predetermined distance of the entrance geographic location. In some example embodiments, the visual representation of the path 670 comprises a dotted line. However, other types of visual representations of the path 670 are also within the scope of the present disclosure.

In some example embodiments, the place 330 is a sub-unit of another place (e.g., a store within a shopping mall), and the service module 104 is configured to cause a visual representation of a rooftop geographic location of the place to be highlighted within the user interface of the computing device in response to the detecting that the current geographic location of the computing device of the user is within a predetermined distance of the entrance geographic location. The rooftop geographic location of the place represents a specific geographic location of the place within the other place. In some example embodiments, the causing the visual representation of the rooftop geographic location to be highlighted comprises displaying an identifying label (e.g., the name of the place 330) in association with the visual representation of the rooftop geographic location within the user interface.

Figure 7:
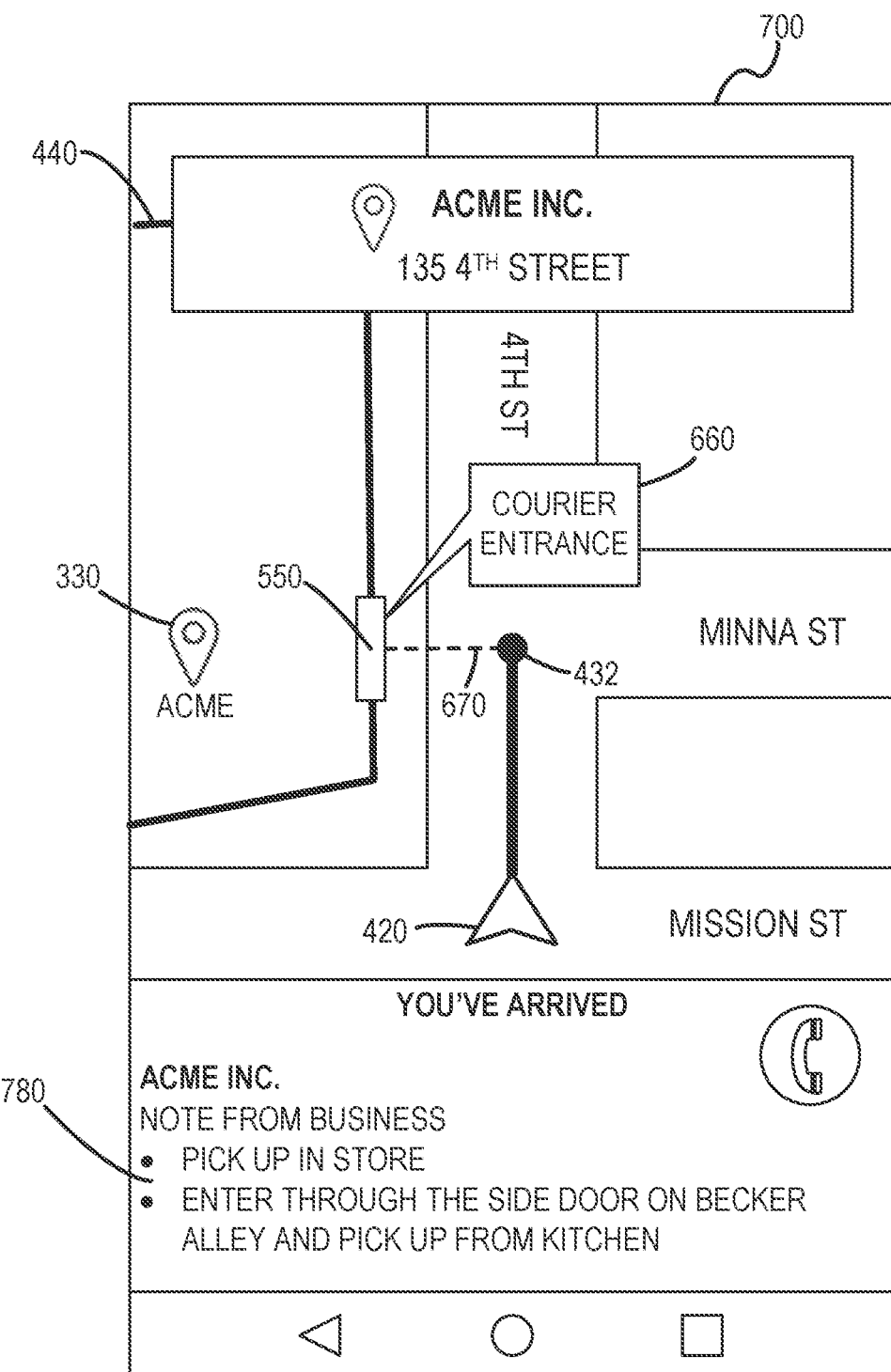
FIG. 7 illustrates a GUI in which instructions for walking to the place are displayed, in accordance with some example embodiments.

FIG. 7 illustrates a GUI 700 in which instructions 780 for walking to the place 330 are displayed, in accordance with some example embodiments. In some example embodiments, service module 104 is configured to detect that the current geographic location 420 of the computing device of the user is within a predetermined distance (e.g., within 50 feet) of the entrance geographic location of the place or that the computing device of the user has arrived at the end of the route 432, and causes the instructions 780 for walking to the place 330 to be displayed within the GUI 700 of the computing device in response to the detecting the current geographic location 420 of the computing device of the user is within a predetermined distance (e.g., within 50 feet) of the entrance geographic location of the place or that the computing device of the user has arrived at the end of the route 432. Other types of instructions or notes are also within the scope of the present disclosure.

Figure 8:
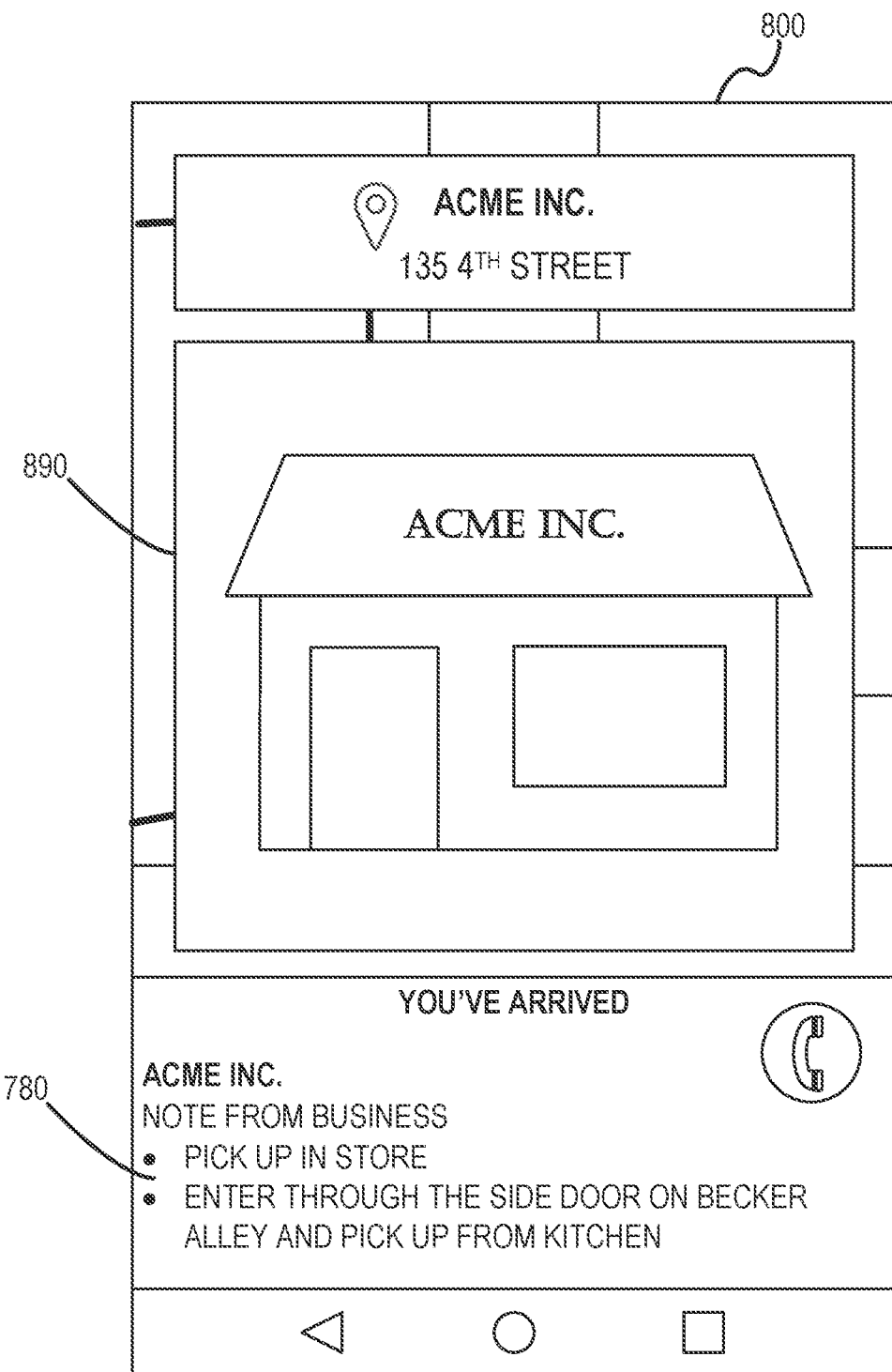
FIG. 8 illustrates a GUI in which a photographic image of the place is displayed, in accordance with some example embodiments.

FIG. 8 illustrates a GUI 800 in which a photographic image 890 of the place 330 is displayed, in accordance with some example embodiments. In some example embodiments, service module 104 is configured to detect that the current geographic location 420 of the computing device of the user is within a predetermined distance (e.g., within 50 feet) of the entrance geographic location of the place or that the computing device of the user has arrived at the end of the route 432, and causes the photographic image 890 of the place to be displayed within the GUI 800 of the computing device in response to the detecting the current geographic location 420 of the computing device of the user is within a predetermined distance (e.g., within 50 feet) of the entrance geographic location of the place or that the computing device of the user has arrived at the end of the route 432.

Figure 9:
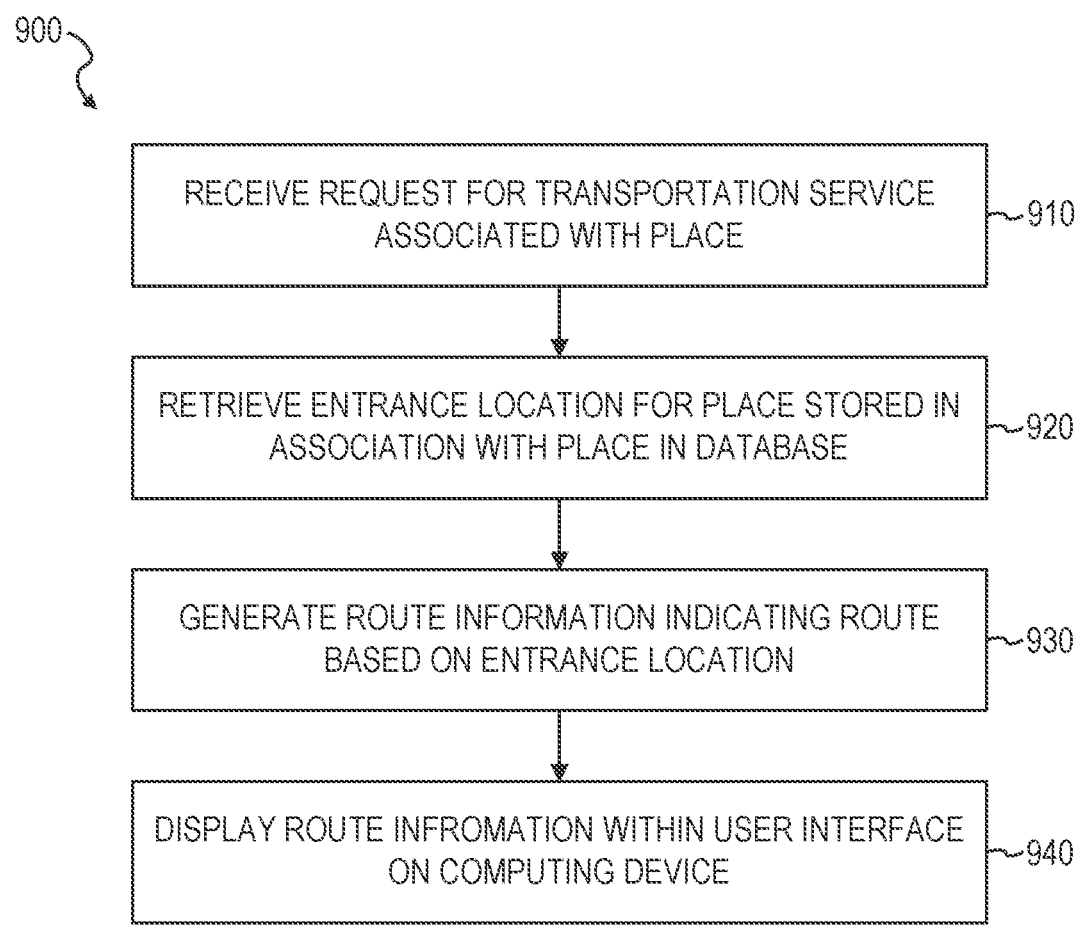
FIG. 9 is a flowchart illustrating a method of providing a user interface in which one or more map features associated with a place are selectively highlighted, in accordance with some example embodiments.

FIG. 9 is a flowchart illustrating a method 900 of providing a user interface in which one or more map features associated with a place are selectively highlighted, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the networked computer system 100 of FIG. 1, or any combination of one or more of its components or modules (e.g., prediction module 102, service module 104), as described above.

At operation 910, the networked computer system 100 receives a request for a transportation service associated with a place. In some example embodiments, the transportation service comprises delivering one or more items to or from the place. At operation 920, the networked computer system 100 retrieves an entrance geographic location for the place from a database. In some example embodiments, the entrance geographic location is stored in association with the place in the database, and the entrance geographic location represents an entrance for accessing the place. At operation 930, the networked computer system 100 generates route information based on the retrieved entrance geographic location. In some example embodiments, the route information indicates a route from an origin geographic location of a computing device of a user to the entrance geographic location of the place. In some example embodiments, the route is based on a determination as to the type of the transportation service, and different routes from the origin geographic location to the entrance geographic location of the place are generated for different types of the transportation service. For example, one route from the origin geographic location to the entrance geographic location of the place may be generated for one type of transportation service, such as transporting a passenger to or from the place, and another route from the same origin geographic location to the same entrance geographic location of the place may be generated for another type of transportation service, such as transporting a freight of items to or from the place. This feature addresses the problem of different roads being suitable for certain types of vehicles (e.g., large trucks used for transportation of freights), and other roads not being suitable (e.g., too narrow or having low vertical clearance) for those types of vehicles. At operation 940, the networked computer system 100 causes the generated route information to be displayed within a user interface on a computing device of the user.

It is contemplated that any of the other features described within the present disclosure can be incorporated into the method 900.

Figure 10:
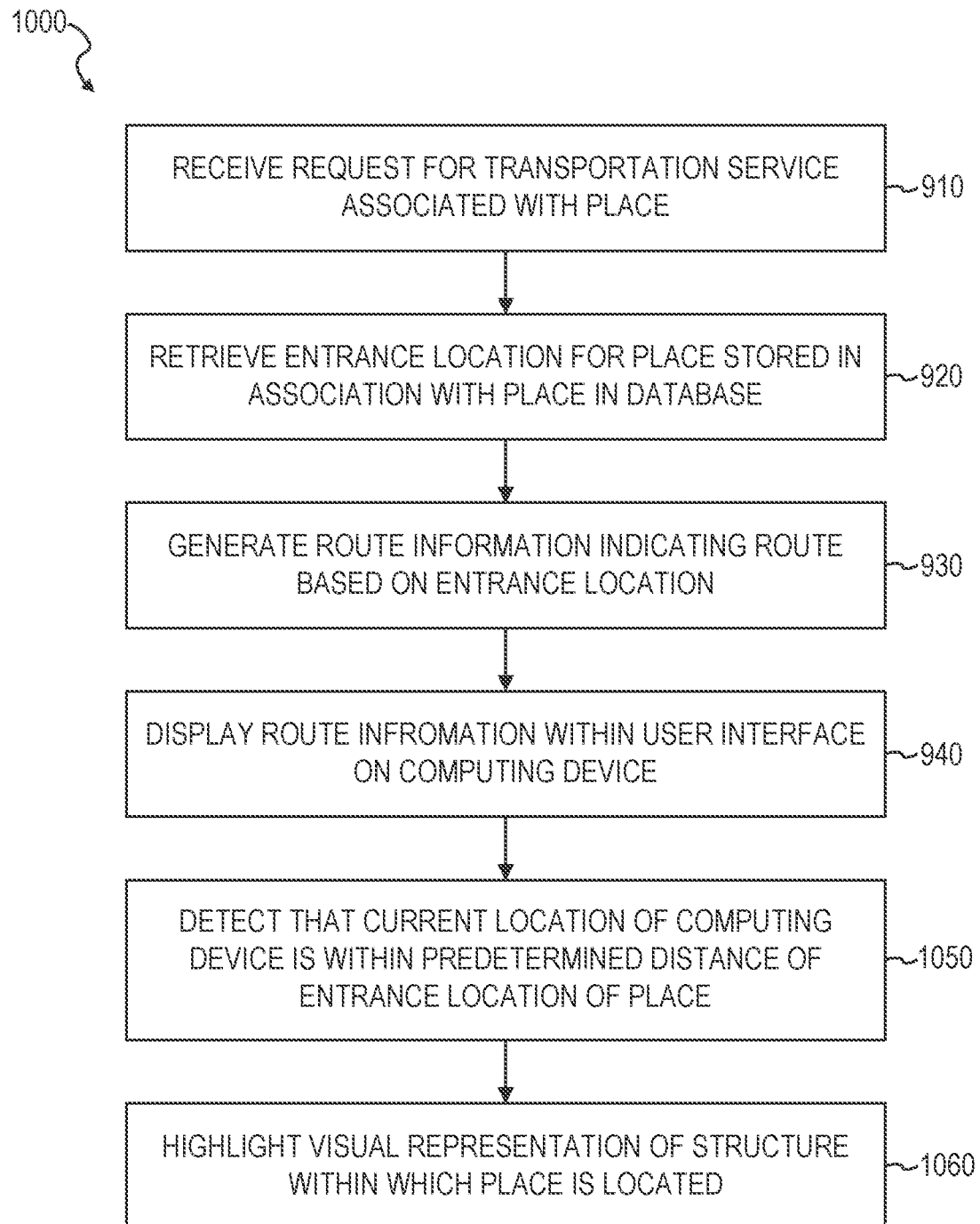
FIG. 10 is a flowchart illustrating another method of providing a user interface in which one or more map features associated with a place are selectively highlighted, in accordance with some example embodiments.

FIG. 10 is a flowchart illustrating another method 1000 of providing a user interface in which one or more map features associated with a place are selectively highlighted, in accordance with some example embodiments. The method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the networked computer system 100 of FIG. 1, or any combination of one or more of its components or modules (e.g., prediction module 102, service module 104), as described above.

The method 1000 comprises operations 1050 and 1060. In some example embodiments, operation 1050 is performed after or concurrently with operation 940 of FIG. 9. At operation 1050, the networked computer system 100 detects that a current geographic location of the computing device of the user is within a predetermined distance of the entrance geographic location of the place. At operation 1060, the networked computer system 100 causes a visual representation of a structure within which the place is located to be highlighted within the user interface of the computing device in response to the detecting that the current geographic location of the computing device of the user is within a predetermined distance of the entrance geographic location. In some example embodiments, the causing the visual representation of the structure to be highlighted comprises applying a visual effect to an outline of the structure.

It is contemplated that any of the other features described within the present disclosure can be incorporated into the method 1000.

Figure 11:
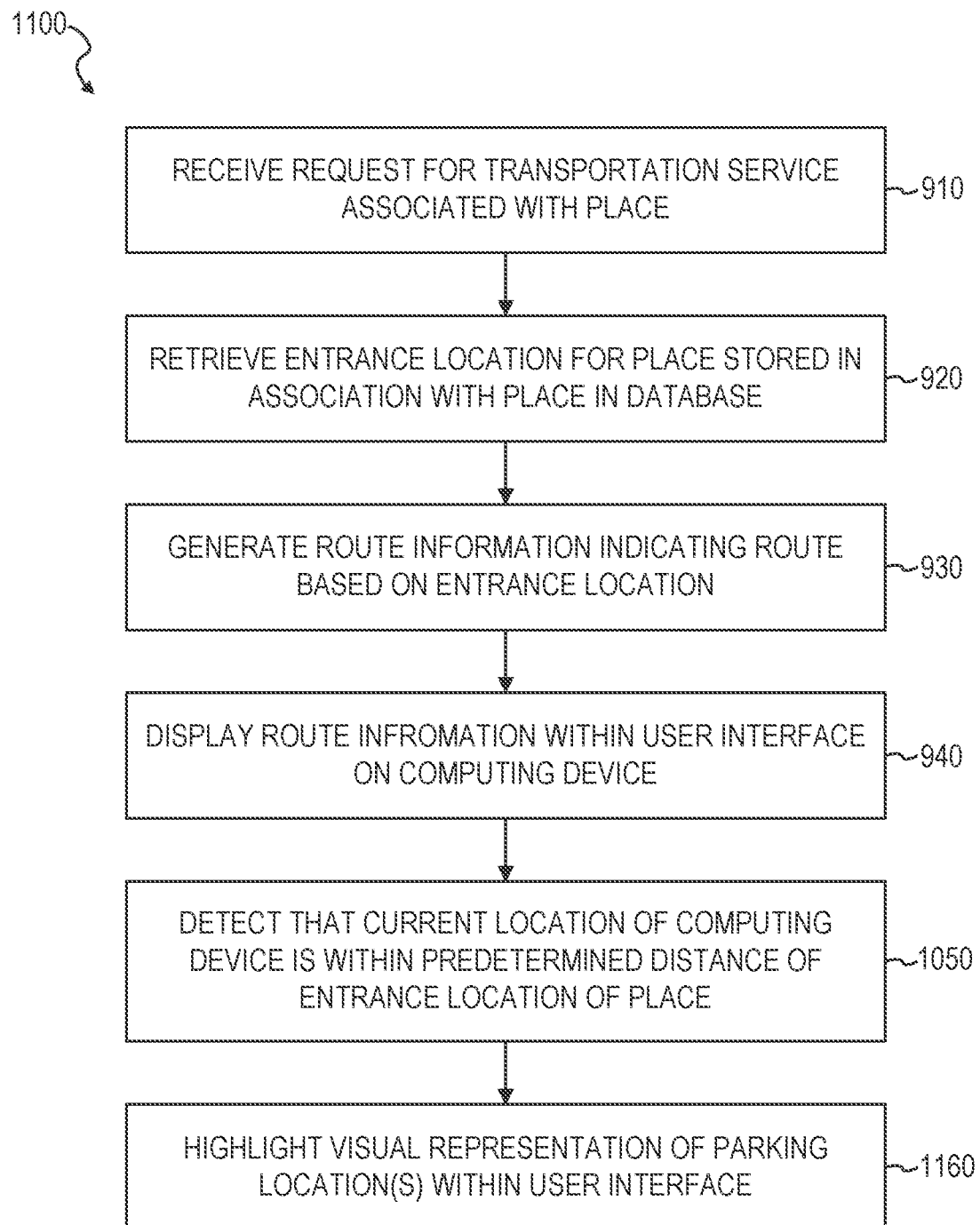
FIG. 11 is a flowchart illustrating yet another method of providing a user interface in which one or more map features associated with a place are selectively highlighted, in accordance with some example embodiments.

FIG. 11 is a flowchart illustrating yet another method 1100 of providing a user interface in which one or more map features associated with a place are selectively highlighted, in accordance with some example embodiments. The method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the networked computer system 100 of FIG. 1, or any combination of one or more of its components or modules (e.g., prediction module 102, service module 104), as described above.

The method 1100 comprises operation 1160. In some example embodiments, operation 1160 is performed after operation 1050 of FIG. 10. At operation 1160, the networked computer system 100 causes a visual representation of at least one parking geographic location to be highlighted within the user interface of the computing device in response to the detecting that the current geographic location of the computing device of the user is within a predetermined distance of the entrance geographic location at operation 1050. In some example embodiments, the at least one parking geographic location is retrieved from the database and stored in association with the place in the database, and the at least one parking geographic location represents an area for parking a vehicle.

It is contemplated that any of the other features described within the present disclosure can be incorporated into the method 1100.

Figure 12:
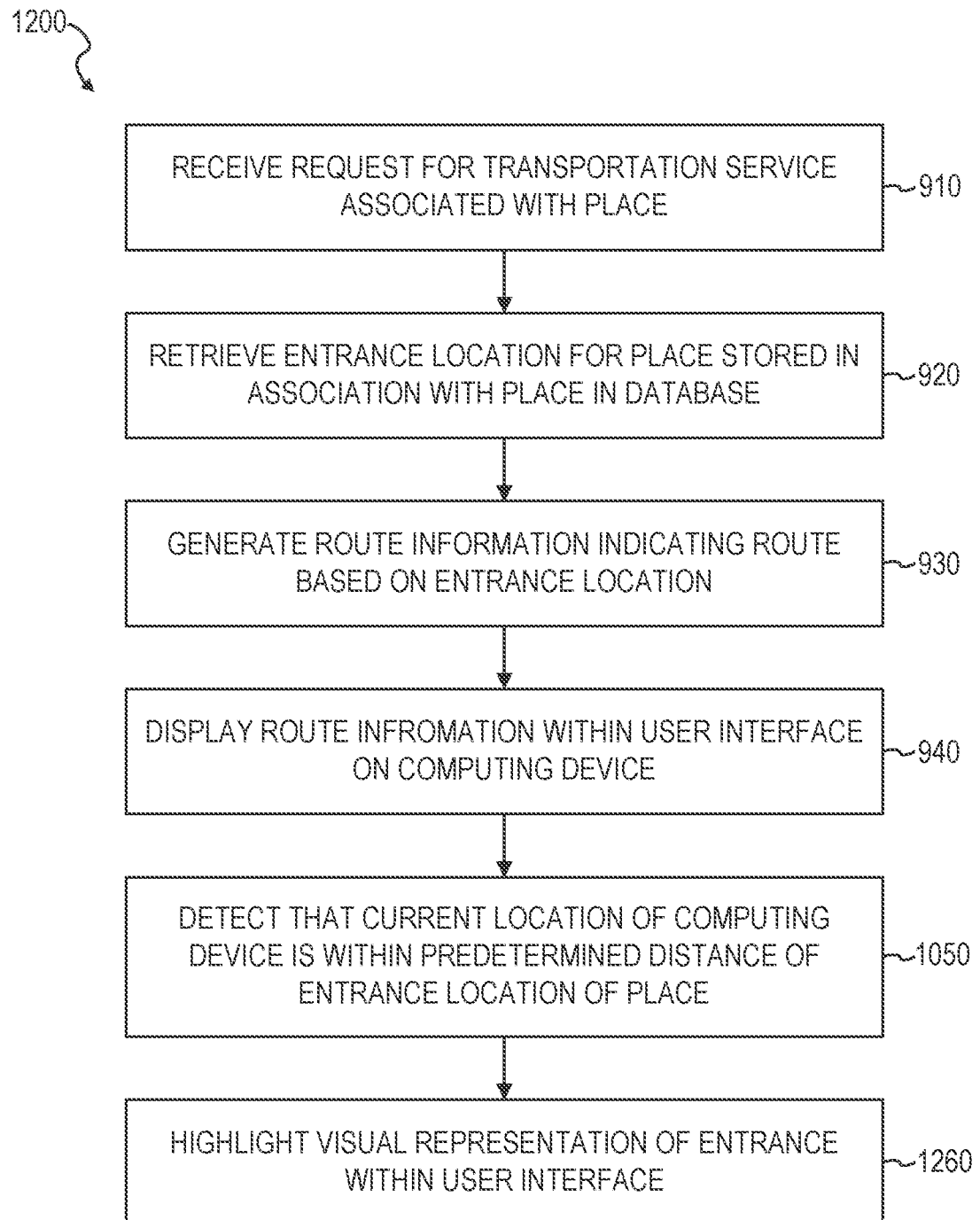
FIG. 12 is a flowchart illustrating yet another method of providing a user interface in which one or more map features associated with a place are selectively highlighted, in accordance with some example embodiments.

FIG. 12 is a flowchart illustrating yet another method 1200 of providing a user interface in which one or more map features associated with a place are selectively highlighted, in accordance with some example embodiments. The method 1200 can be performed by processing logic that can comprise hardware (e.g., circuitry, dedicated logic, programmable logic, microcode, etc.), software (e.g., instructions run on a processing device), or a combination thereof. In one example embodiment, the method 1200 is performed by the networked computer system 100 of FIG. 1, or any combination of one or more of its components or modules (e.g., prediction module 102, service module 104), as described above.

The method 1200 comprises operation 1260. In some example embodiments, operation 1260 is performed after operation 1050 of FIG. 10. At operation 1260, the networked computer system 100 causes a visual representation of the entrance to be highlighted within the user interface of the computing device in response to the detecting that the current geographic location of the computing device of the user is within a predetermined distance of the entrance geographic location at operation 1050. In some example embodiments, the causing the visual representation of the entrance to be highlighted comprises applying a visual effect to the entrance. In some example embodiments, the causing the visual representation of the entrance to be highlighted comprises displaying an identifying label in association with the visual representation of the entrance within the user interface.

It is contemplated that any of the other features described within the present disclosure can be incorporated into the method 1200.

Figure 13:
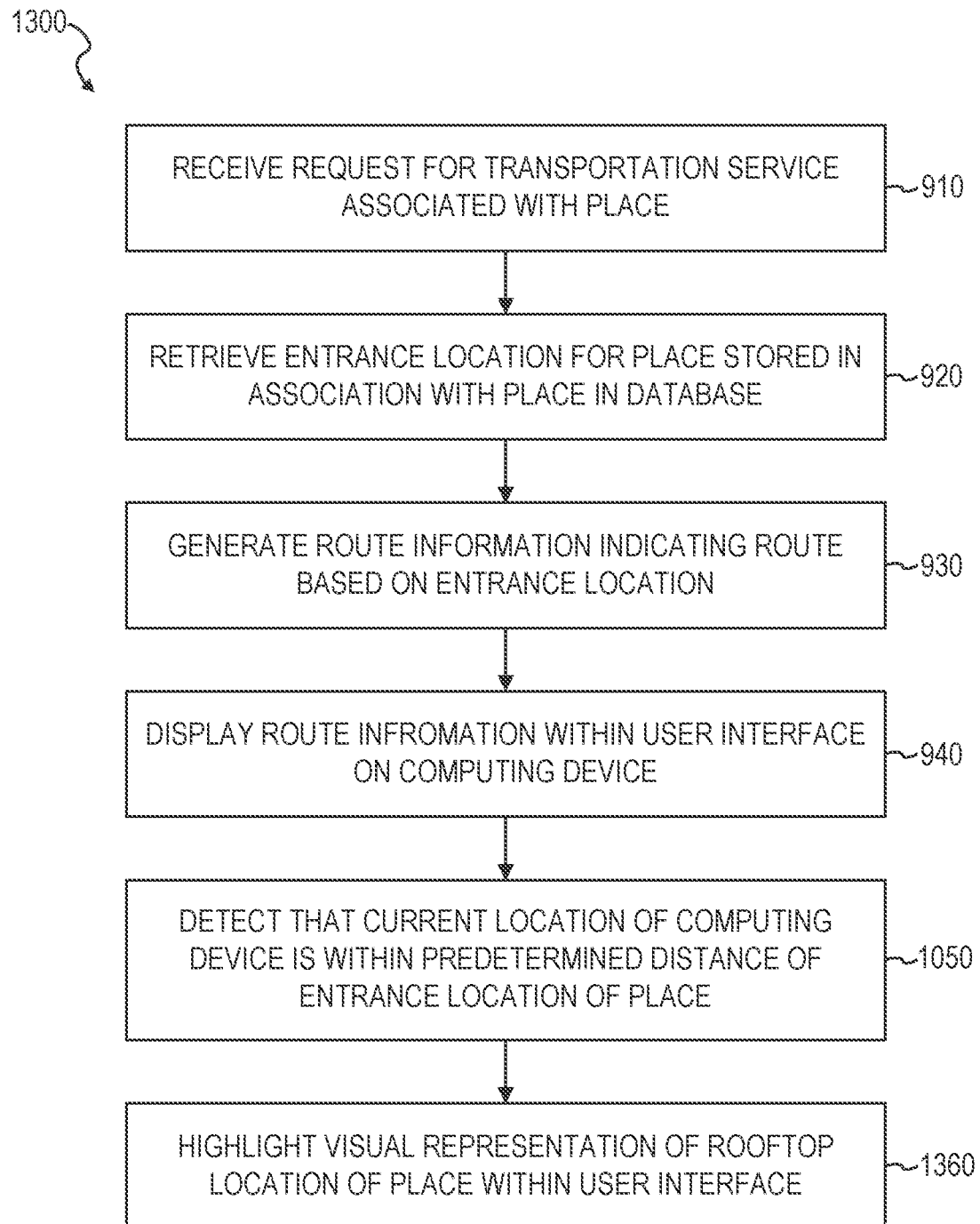
FIG. 13 is a flowchart illustrating yet another method of providing a user interface in which one or more map features associated with a place are selectively highlighted, in accordance with some example embodiments.

FIG. 13 is a flowchart illustrating yet another method 1300 of providing a user interface in which one or more map features associated with a place are selectively highlighted, in accordance with some example embodiments. The method 1300 can be performed by processing logic that can comprise hardware (e.g., circuitry, dedicated logic, programmable logic, microcode, etc.), software (e.g., instructions run on a processing device), or a combination thereof. In one example embodiment, the method 1300 is performed by the networked computer system 100 of FIG. 1, or any combination of one or more of its components or modules (e.g., prediction module 102, service module 104), as described above.

The method 1300 comprises operation 1360. In some example embodiments, operation 1360 is performed after operation 1050 of FIG. 10. At operation 1360, the networked computer system 100 causes a visual representation of a rooftop geographic location of the place to be highlighted within the user interface of the computing device in response to the detecting that the current geographic location of the computing device of the user is within a predetermined distance of the entrance geographic location at operation 1050. In some example embodiments, the place is a sub-unit of another place, and the rooftop geographic location of the place represents a specific geographic location of the place within the other place. In some example embodiments, the causing the visual representation of the rooftop geographic location to be highlighted comprises displaying an identifying label in association with the visual representation of the rooftop geographic location within the user interface.

It is contemplated that any of the other features described within the present disclosure can be incorporated into the method 1300.

Figure 14:
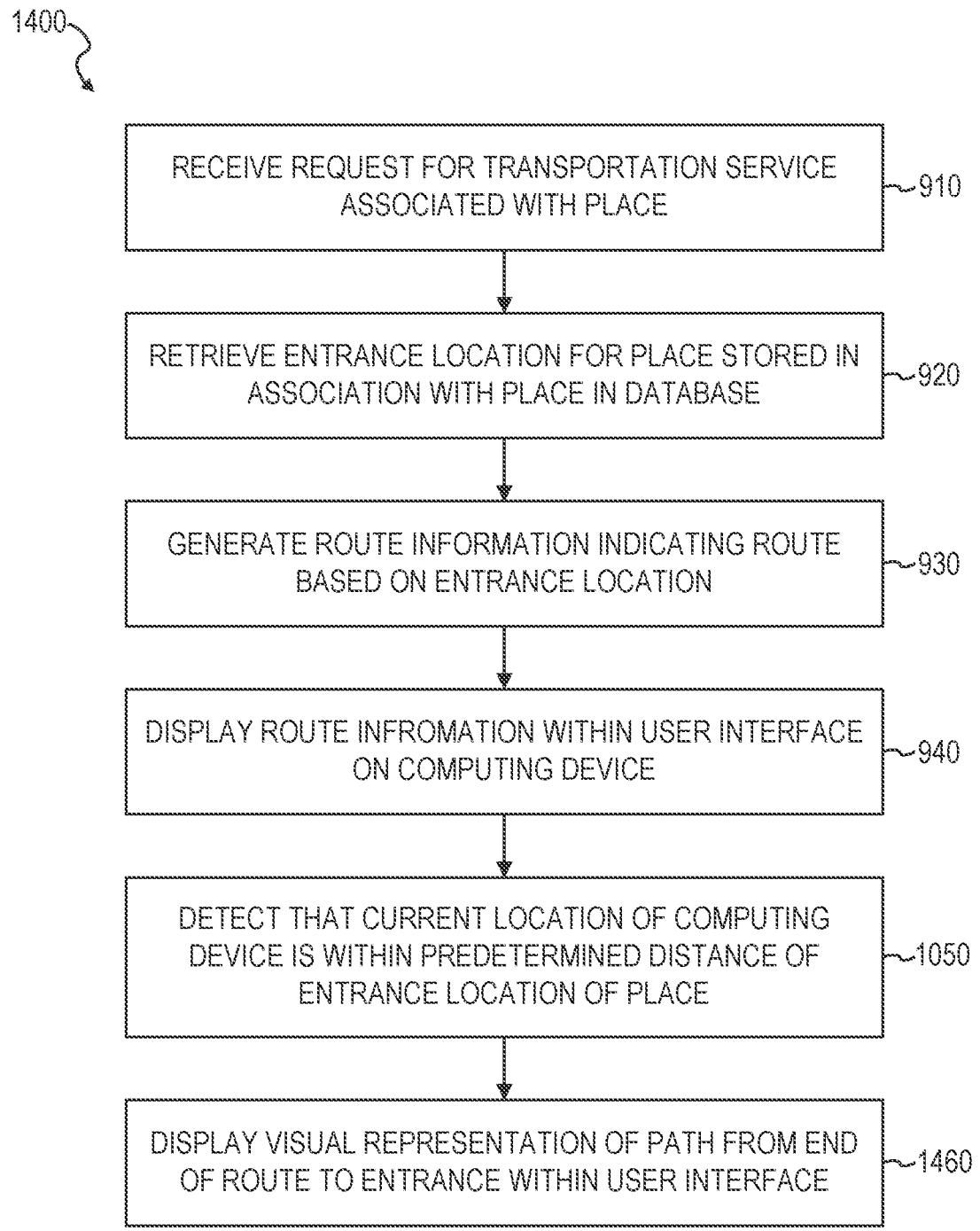
FIG. 14 is a flowchart illustrating yet another method of providing a user interface in which one or more map features associated with a place are selectively highlighted, in accordance with some example embodiments.

FIG. 14 is a flowchart illustrating yet another method 1400 of providing a user interface in which one or more map features associated with a place are selectively highlighted, in accordance with some example embodiments. The method 1400 can be performed by processing logic that can comprise hardware (e.g., circuitry, dedicated logic, programmable logic, microcode, etc.), software (e.g., instructions run on a processing device), or a combination thereof. In one example embodiment, the method 1400 is performed by the networked computer system 100 of FIG. 1, or any combination of one or more of its components or modules (e.g., prediction module 102, service module 104), as described above.

The method 1400 comprises operation 1460. In some example embodiments, operation 1460 is performed after operation 1050 of FIG. 10. At operation 1460, the networked computer system 100 causes a visual representation of a path from an end of the route to the entrance to be displayed within the user interface of the computing device in response to the detecting that the current geographic location of the computing device of the user is within a predetermined distance of the entrance geographic location at operation 1050.

It is contemplated that any of the other features described within the present disclosure can be incorporated into the method 1400.

Figure 15:
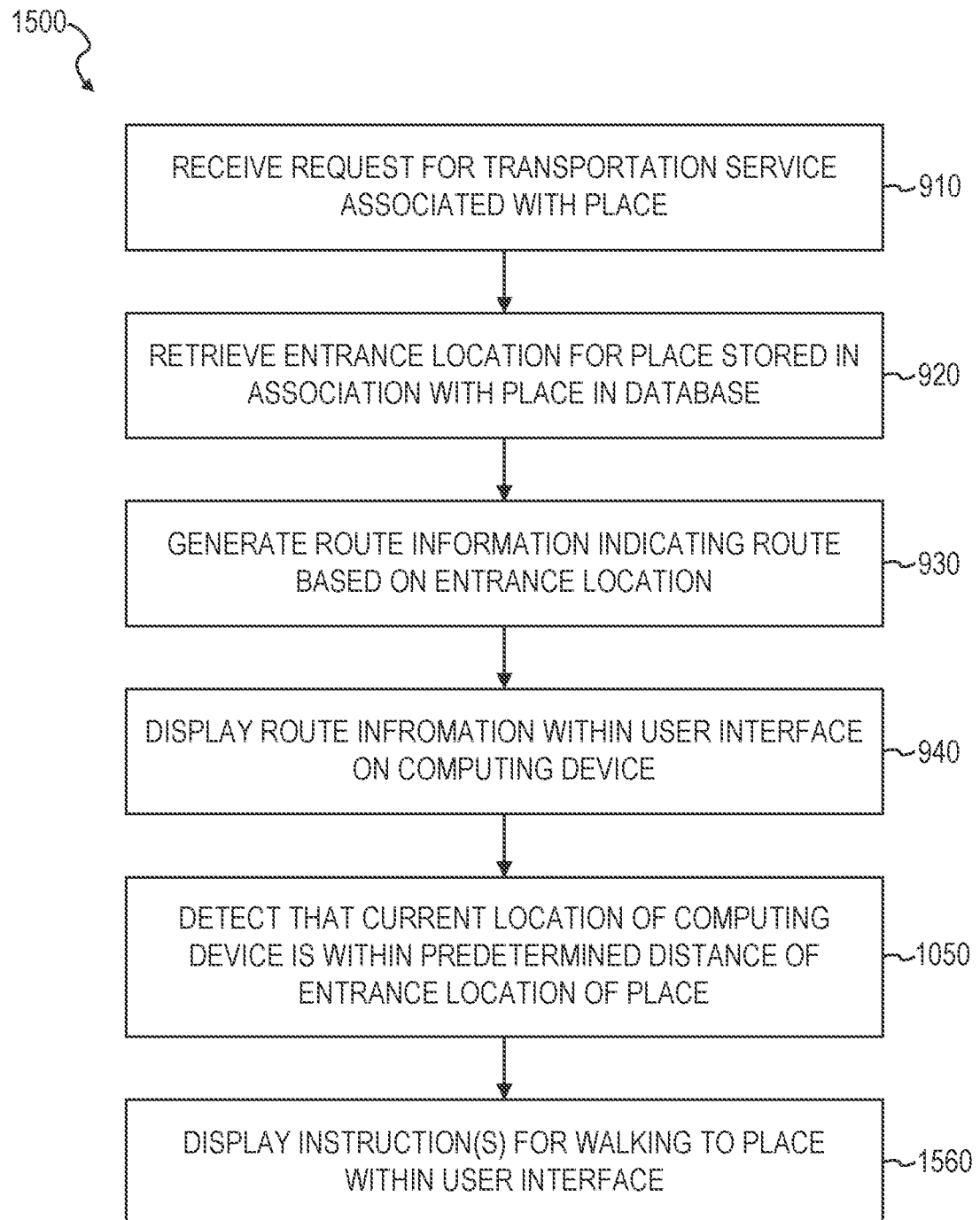
FIG. 15 is a flowchart illustrating yet another method of providing a user interface in which one or more map features associated with a place are selectively highlighted, in accordance with some example embodiments.

FIG. 15 is a flowchart illustrating yet another method 1500 of providing a user interface in which one or more map features associated with a place are selectively highlighted, in accordance with some example embodiments. The method 1500 can be performed by processing logic that can comprise hardware (e.g., circuitry, dedicated logic, programmable logic, microcode, etc.), software (e.g., instructions run on a processing device), or a combination thereof. In one example embodiment, the method 1500 is performed by the networked computer system 100 of FIG. 1, or any combination of one or more of its components or modules (e.g., prediction module 102, service module 104), as described above.

The method 1500 comprises operation 1560. In some example embodiments, operation 1560 is performed after operation 1050 of FIG. 10. At operation 1560, the networked computer system 100 causes one or more instructions for walking to the place to be displayed within the user interface of the computing device in response to the detecting that the current geographic location of the computing device of the user is within a predetermined distance of the entrance geographic location at operation 1050.

It is contemplated that any of the other features described within the present disclosure can be incorporated into the method 1500.

Figure 16:
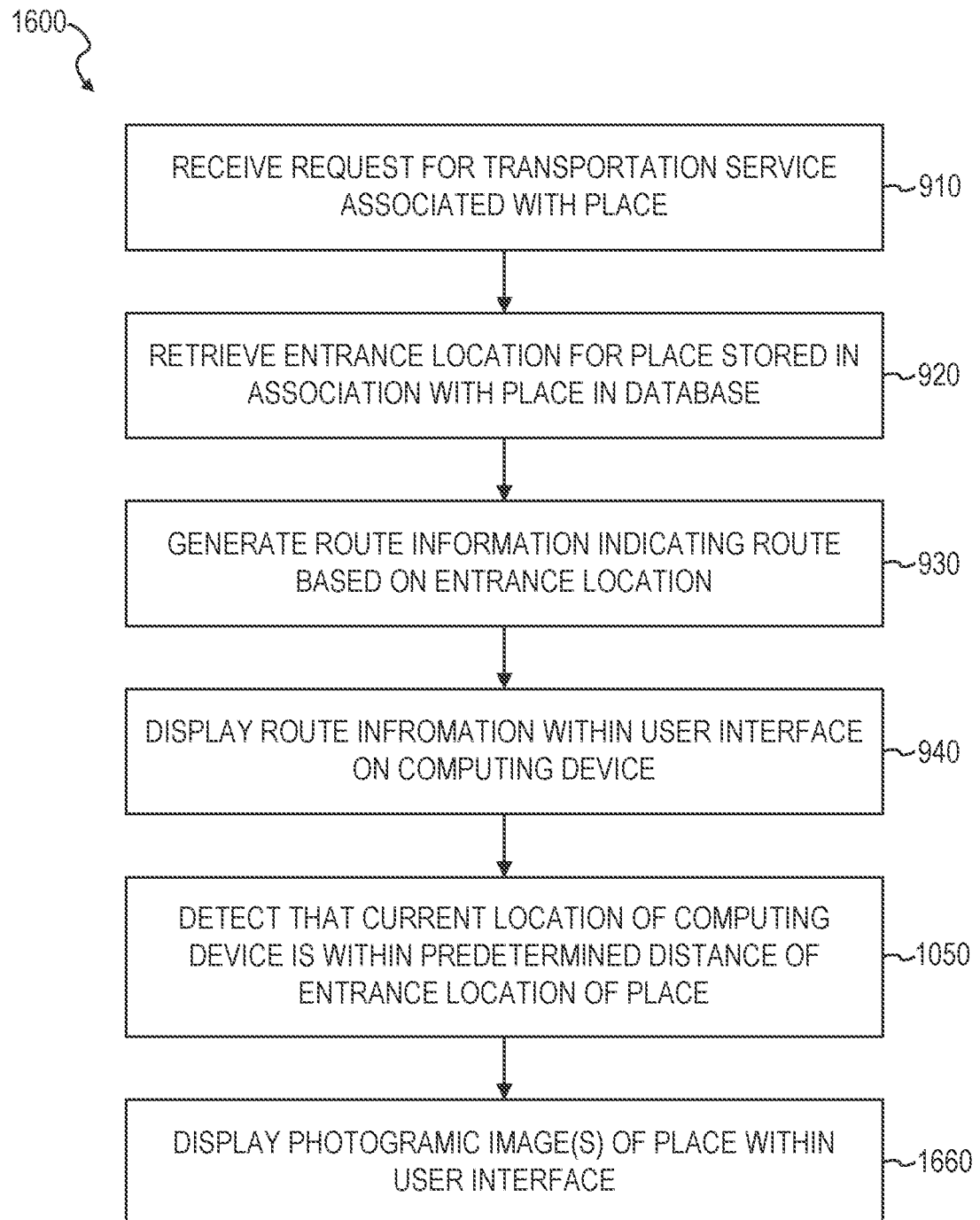
FIG. 16 is a flowchart illustrating yet another method of providing a user interface in which one or more map features associated with a place are selectively highlighted, in accordance with some example embodiments.

FIG. 16 is a flowchart illustrating yet another method 1600 of providing a user interface in which one or more map features associated with a place are selectively highlighted, in accordance with some example embodiments. The method 1600 can be performed by processing logic that can comprise hardware (e.g., circuitry, dedicated logic, programmable logic, microcode, etc.), software (e.g., instructions run on a processing device), or a combination thereof. In one example embodiment, the method 1600 is performed by the networked computer system 100 of FIG. 1, or any combination of one or more of its components or modules (e.g., prediction module 102, service module 104), as described above.

The method 1600 comprises operation 1660. In some example embodiments, operation 1660 is performed after operation 1050 of FIG. 10. At operation 1660, the networked computer system 100 causes at least one photographic image of the place to be displayed within the user interface of the computing device in response to the detecting that the current geographic location of the computing device of the user is within a predetermined distance of the entrance geographic location at operation 1050.

It is contemplated that any of the other features described within the present disclosure can be incorporated into the method 1600.

Figure 17:
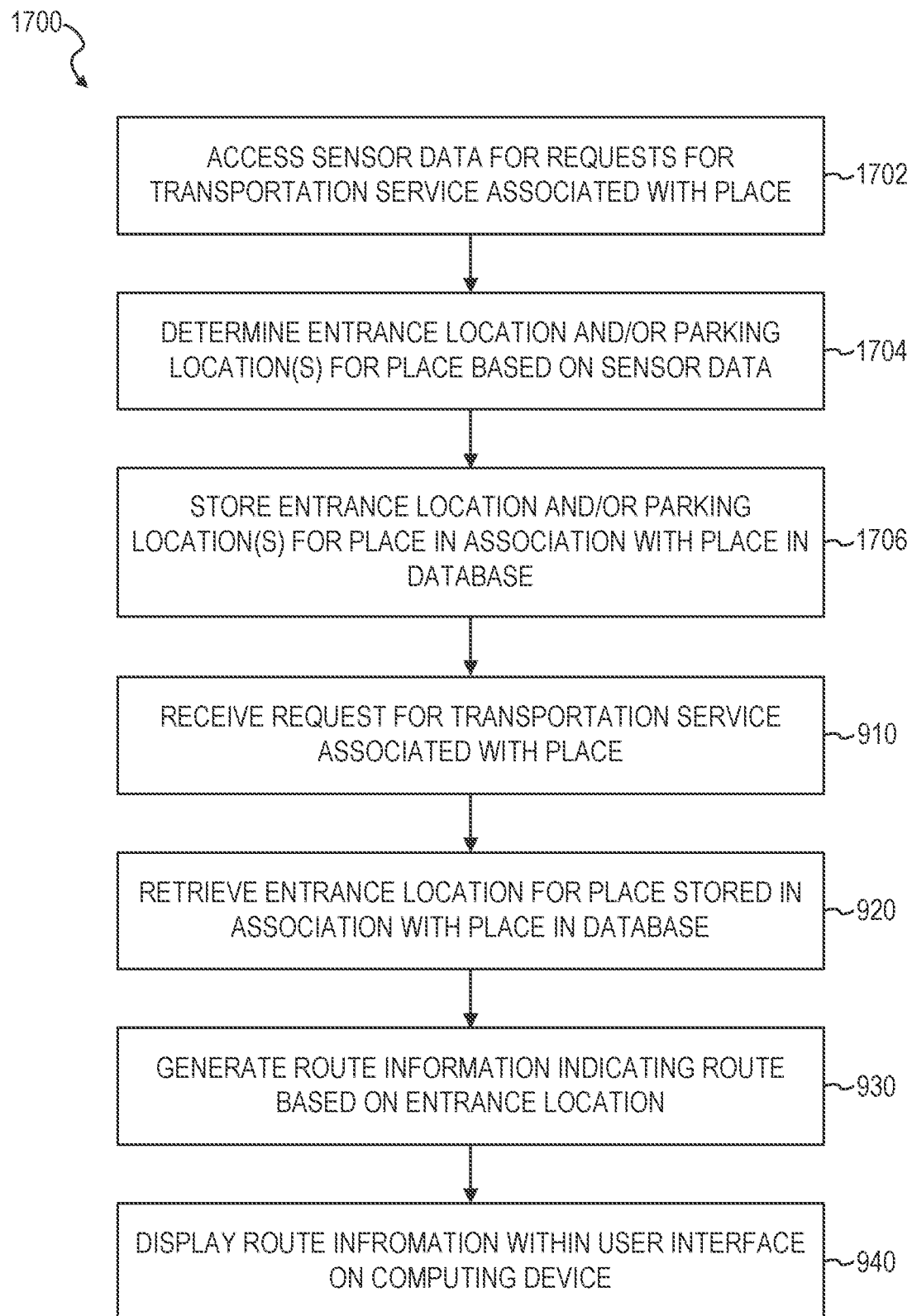
FIG. 17 is a flowchart illustrating yet another method of providing a user interface in which one or more map features associated with a place are selectively highlighted, in accordance with some example embodiments.

FIG. 17 is a flowchart illustrating yet another method 1700 of providing a user interface in which one or more map features associated with a place are selectively highlighted, in accordance with some example embodiments. The method 1700 can be performed by processing logic that can comprise hardware (e.g., circuitry, dedicated logic, programmable logic, microcode, etc.), software (e.g., instructions run on a processing device), or a combination thereof. In one example embodiment, the method 1700 is performed by the networked computer system 100 of FIG. 1, or any combination of one or more of its components or modules (e.g., prediction module 102, service module 104), as described above.

The method 1700 comprises operations 1702, 1704, and 1706. In some example embodiments, operations 1702, 1704, and 1706 precede operation 910 of FIG. 9. At operation 1702, the networked computer system 100 accesses corresponding sensor data for each one of a plurality of other requests for the transportation service associated with the place. In some example embodiments, the corresponding sensor data for each one of the plurality of other requests indicates a corresponding path of a mobile device of a corresponding provider of the transportation service for the one of the plurality of other requests. At operation 1704, the networked computer system 100 determines one or more of the entrance geographic location for the place and the at least one geographic parking location for the place based on the sensor data for the plurality of other requests for the transportation service associated with the place. At operation 1706, the networked computer system 100 stores one or more of the entrance geographic location for the place and the at least one geographic parking location for the place in association with the place in the database. It is contemplated that any of the other features described within the present disclosure can be incorporated into the method 1700.

FIGS. 18-23 illustrate GUI's in which real-world navigation context and data granularity for pick-up and drop-off portions of a transportation service are provided. These features are particularly useful in use cases involving airports (e.g., where the requester 110 is being picked up from an airport or where the requester 110 is being dropped off at the airport). However, these features may also be applied to other use cases involving other locations for picking up or dropping off a person or item.

Figure 18:
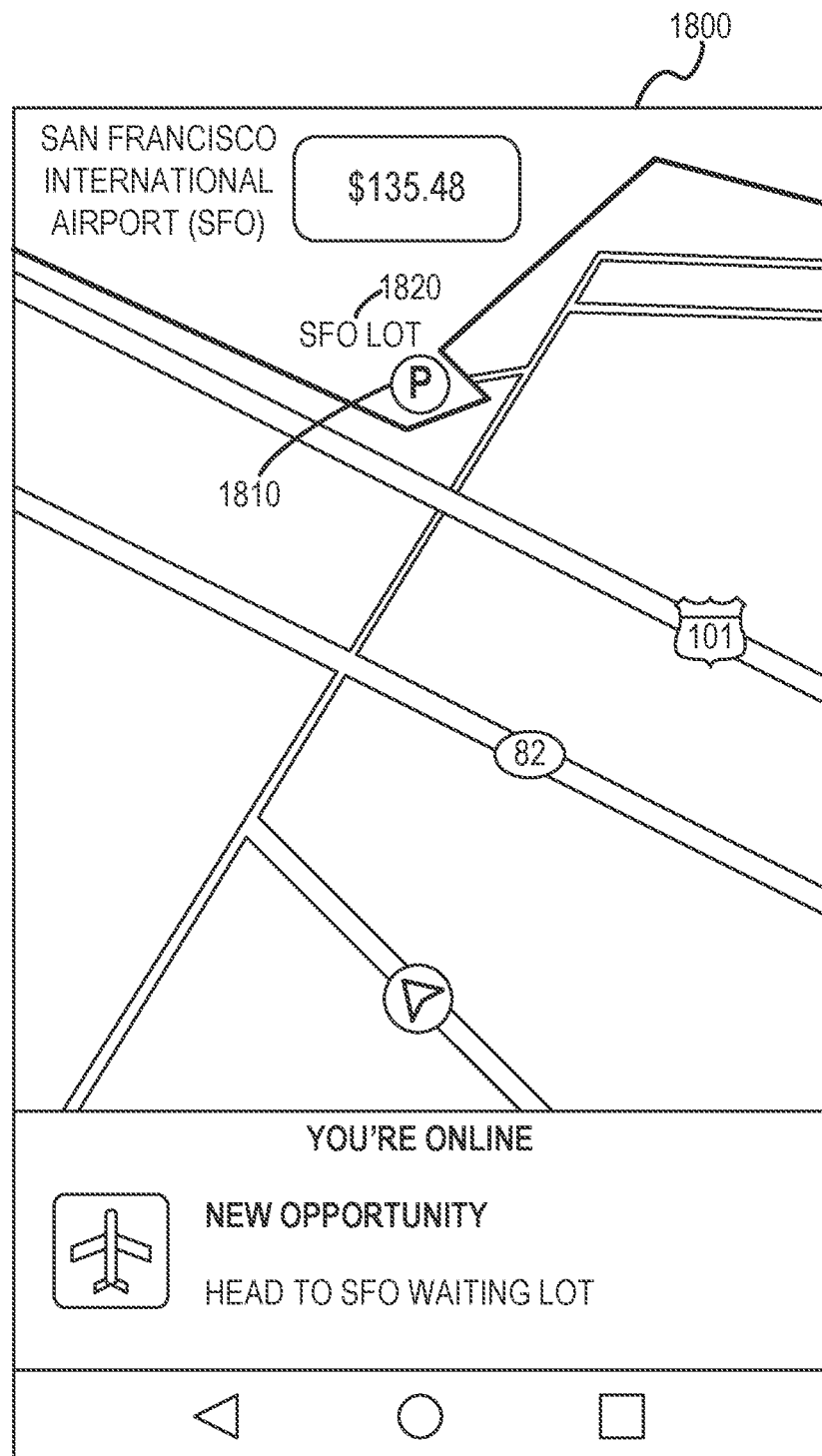
FIG. 18 illustrates a GUI in which a status of a vehicle lot is displayed, in accordance with some example embodiments.

FIG. 18 illustrates a GUI 1800 in which a status of a vehicle lot is displayed, in accordance with some example embodiments. In some example embodiments, detailed information about a point of interest 1810 for a transportation service is provided. In FIG. 18, the point of interest 1810 is a waiting lot where vehicles are able to wait for passengers, such as when a driver 120 is picking up a rider 110 at an airport. In FIG. 18, an indication of the point of interest 1810 is displayed on a map, along with an identification of the point of interest 1820. For each point of interest 1810 for a place, such as the airport, the point of interest 1810 may be stored as an attribute of the place, such as in the form of feature data in association with the place in mapping 200 of FIG. 2. This additional feature data may include an identification of the point of interest and a geographic location of the point of interest. Additionally, the GUI 1800 may also display an indication of the status of the point of interest 1810, such as an indication of an availability level of the waiting lot. In some example embodiments, the GUI 1800 may display the indication of the point of interest 1810 and/or the identification of the point of interest 1820 in a particular color corresponding to the current availability level of the point of interest. For example, the GUI 1800 may display the indication of the point of interest 1810 and/or the identification of the point of interest 1820 in blue when a large portion of the corresponding waiting lot is available for use, in yellow when only a small portion of the corresponding waiting lot is available for use, and in red when no portion (or almost no portion) of the corresponding waiting lot is available for use. Other visual effects and representations may be used by the GUI 1800 to indicate the level of availability of the waiting lot or some other point of interest. The level of availability of the corresponding point of interest may be provided to the service module 104 for use in the GUI 1800 and may be based on sensors or other devices configured to detect or otherwise determine what portion of the point of interest is available for use.

Figure 19:
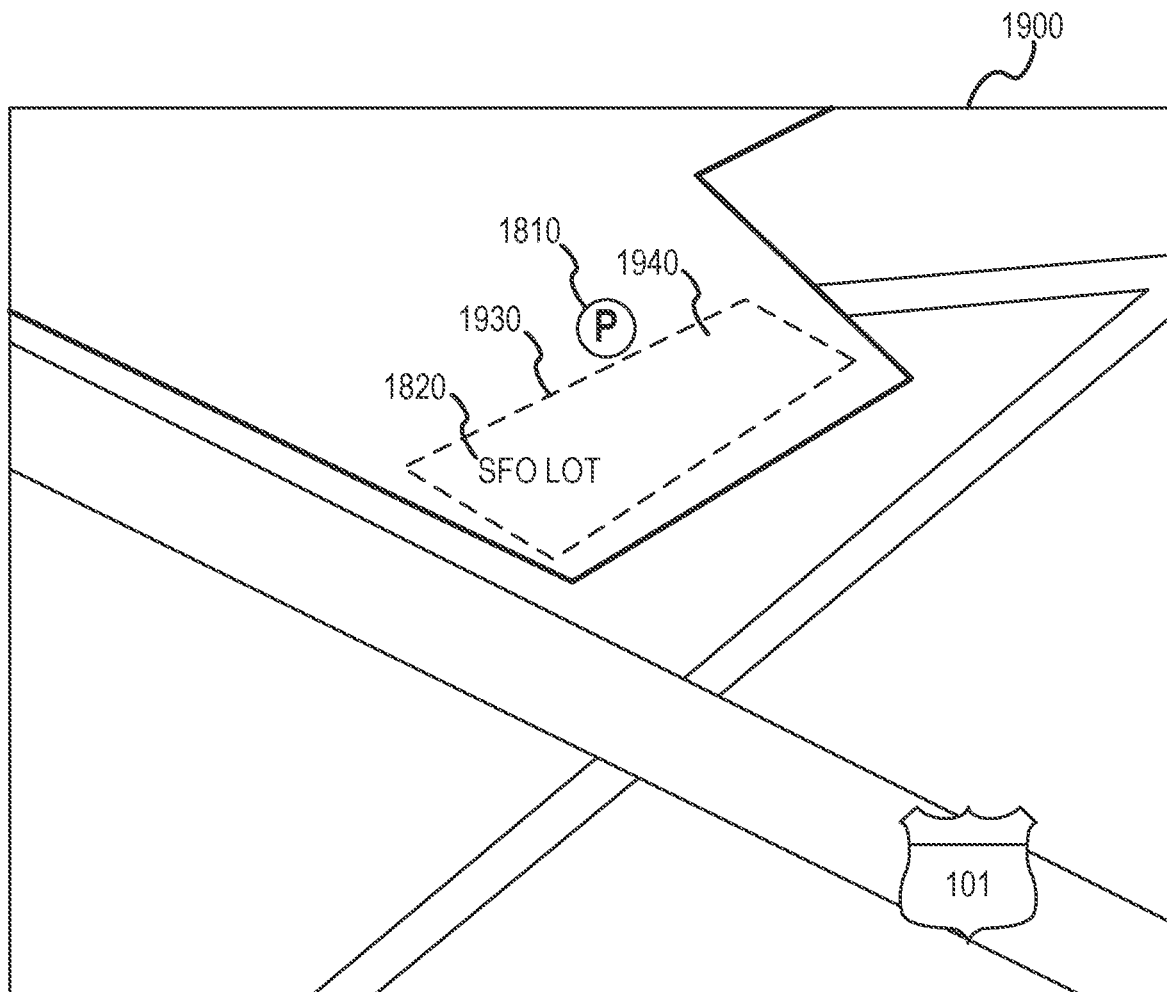
FIG. 19 illustrates a GUI in which a boundary and a footprint area of the vehicle lot is displayed, in accordance with some example embodiments.

FIG. 19 illustrates a GUI 1900 in which a boundary 1930 and a footprint area 1940 of the vehicle lot 1820 of FIG. 18 is displayed, in accordance with some example embodiments. The boundary 1930 and footprint area 1940 provide a visual indication on the map of the specific location and size of the vehicle lot 1820 relative to a place (e.g., the airport) to which a user is navigating and for which the use is receiving navigation information.

Figure 20:
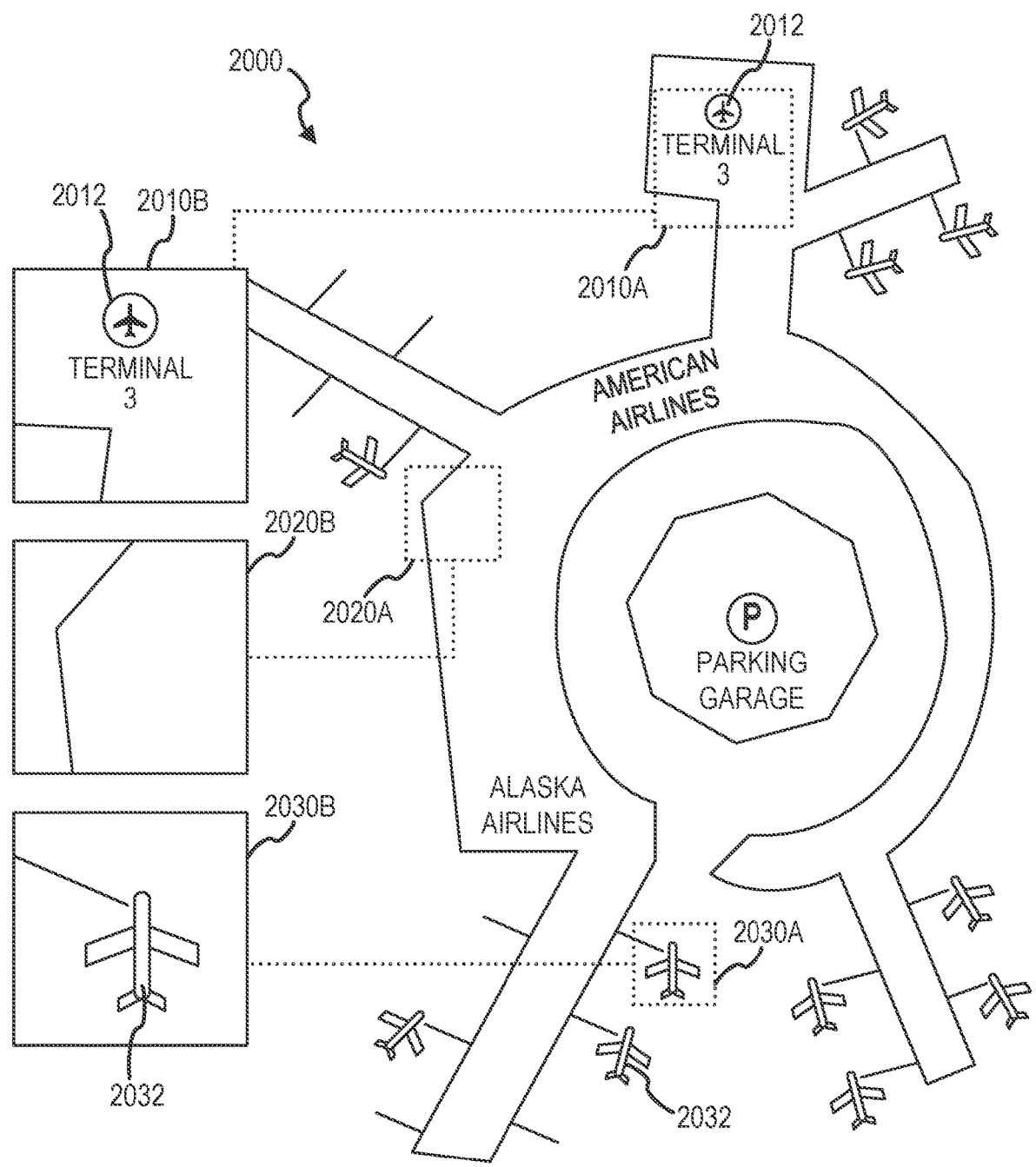
FIG. 20 illustrates a GUI in which in-depth contextual representations of points-of-interests are displayed, in accordance with some example embodiments.

FIG. 20 illustrates a GUI 2000 in which in-depth contextual representations of points-of-interests are displayed, in accordance with some example embodiments. In FIG. 20, the GUI 2000 displays a map of an airport, which may be included in navigation information for a transportation service to or from the airport. The map includes high resolution details of the airport. For example, the map displayed within the GUI 2000 includes a detailed visual representation 2012 of an airport terminal (e.g., "Terminal 3"), showing the specific location of the airport terminal within the airport, as well as additional information related to the transportation service. Additionally, the GUI 2000 may display a visual representation indicating the corresponding transportation service is for a user going to the airport to depart from the airport terminal, such as by using an image of an airplane departing (e.g., taking off) from the airport, as shown in the zoomed-in view 2010B of the dotted portion 2010A of the map.

The map displayed within the GUI 2000 may also visually indicate the status of different gates, such as whether or not a plane is stationed at each gate. For example, in FIG. 20, the dotted portion 2020A of the map indicates that no plane is parked at the gate within the dotted portion 2020A, as shown in the zoomed-in view 2020B, whereas the dotted portion 2030A of the map indicates that a plane 2032 is parked at the gate within the dotted portion 2030A, as shown in the zoomed-in view 2030B. In some example embodiments, the status of each gate may be provided to the service module 104 for use in the GUI 2000 and may be based on sensors, other devices, electronic gate monitoring services, or electronic flight status monitoring services, configured to detect or otherwise determine whether a plane is parked at a particular gate.

Figure 21:
FIG. 21 illustrates a GUI in which detailed destination information is displayed, in accordance with some example embodiments.

FIG. 21 illustrates a GUI 2100 in which detailed destination information is displayed, in accordance with some example embodiments. The detailed information displayed in GUI 2100 includes information that is related to the destination and is synced to the real world. For example, in FIG. 21, the service module 104 is providing navigation information to the user via the GUI 2100, which, in addition to an indication of an upcoming maneuver (e.g., a graphic element instructing the user to turn left in approximately 300 feet), also includes specific information about a specific location within the airport to which the user is travelling and information about the specific location as it relates to the user's flight at the airport. In some example embodiments, this specific information includes indications of a type of flight (e.g., departing flights), a type of service (e.g., ticketing/check-in), a specific terminal (e.g., Terminal 2), and a specific airline (e.g., Alaska Airlines). Other detailed information may also be provided in the GUI 2100.

Figure 22:
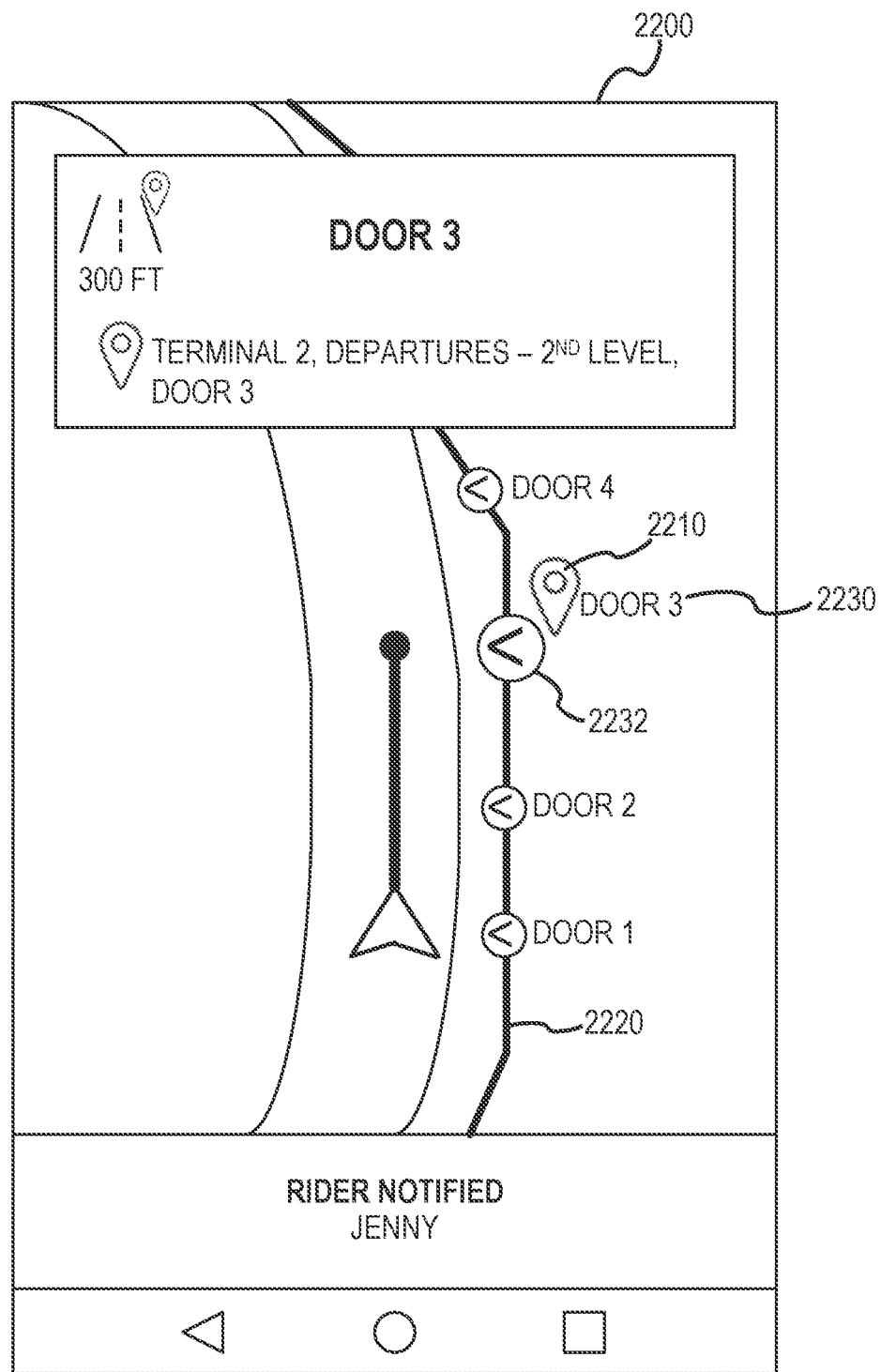
FIG. 22 illustrates a GUI in which a building outline and door information for a pick-up point is displayed, in accordance with some example embodiments.

FIG. 22 illustrates a GUI 2200 in which a building outline 2220 and door information 2230 and 2232 for a pick-up point 2210 is displayed, in accordance with some example embodiments. In FIG. 22, the GUI 2200 displays a map of an airport, highlighting the building outline 2220 (e.g., boundary) of the specific building that the user is navigating to at the airport. The GUI 2200 also highlights the specific door at which to pick up or drop off a rider 110. For example, in FIG. 22, the GUI 2200 displays an identification 2230 of the specific door (e.g., "Door 3"), as well as a visual indication 2232 of the specific location of the specific door.

Figure 23:
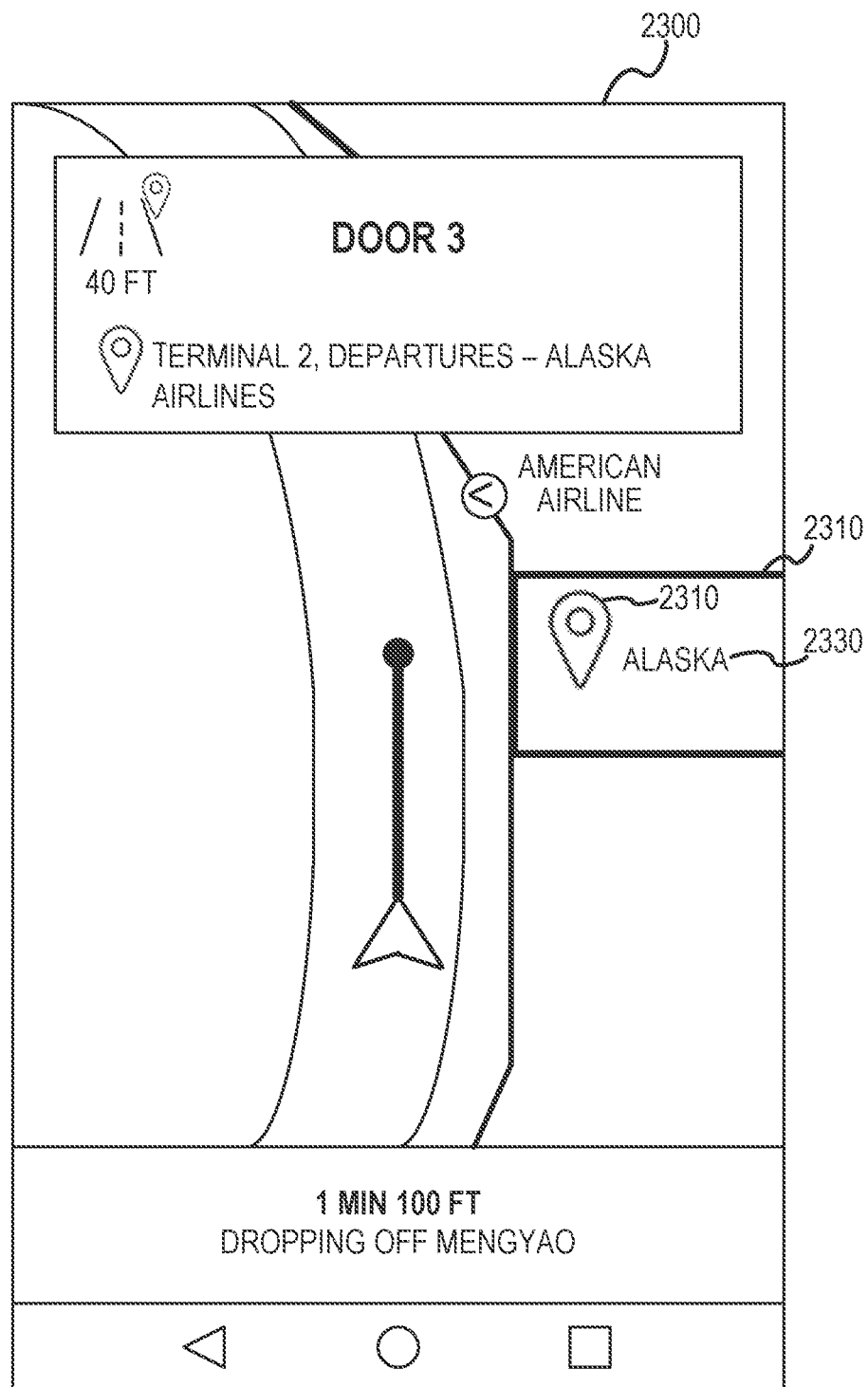
FIG. 23 illustrates a GUI in which a building outline and airline information for a drop-off point is displayed, in accordance with some example embodiments.

FIG. 23 illustrates a GUI 2300 in which a building outline 2320 and airline information 2330 for a drop-off point 2310 is displayed, in accordance with some example embodiments. In FIG. 23, the GUI 2300 highlights the building outline 2320 (e.g., boundary) of the specific building that the user is navigating to at the airport. The GUI 2300 also displays the airline information 2330 corresponding to the flight for which the user is navigating to the airport. For example, the airline information may include an identification of the specific airline 2330 (e.g., Alaska Airlines) that the user will be using to depart from the airport.

In some example embodiments, when a user (e.g., the rider 110) submits a request for transportation to or from an airport, the user includes specific flight information (e.g., airline, flight number) along with the request via a user interface. The service module 104 then uses the specific flight information to generate the features described above with respect to FIGS. 18-23.

In some example embodiments, the networked computer system 100 determines the entrance geographic location for the place based on flight information entered by a user via a GUI. For example, the user may enter one or more of an airline identification, a flight number, and a type of flight (e.g., arrival departure). The networked computer system 100 may then use the flight information to determine the entrance geographic location, such as by accessing a database that stores entrance geographic location in association with the flight information. The entrance geographic location may include elevation information, such as what vertical level or floor the entrance geographic location is positioned on. For example, entrance geographic locations for departure flights for the place may indicate that the entrance geographic location is on a first level, whereas entrance geographic locations for the arrival flights for the place may indicate that the entrance geographic location is on a second level above the first level. This different in vertical levels may affect the route that is determined for the transportation service, as a different road may need to be taken to access the second level as opposed to the first level.

It is contemplated that any features of any embodiments disclosed herein can be combined with any other features of any other embodiments disclosed herein. Accordingly, any such hybrid embodiments are within the scope of the present disclosure.

Example Mobile Device

Figure 24:
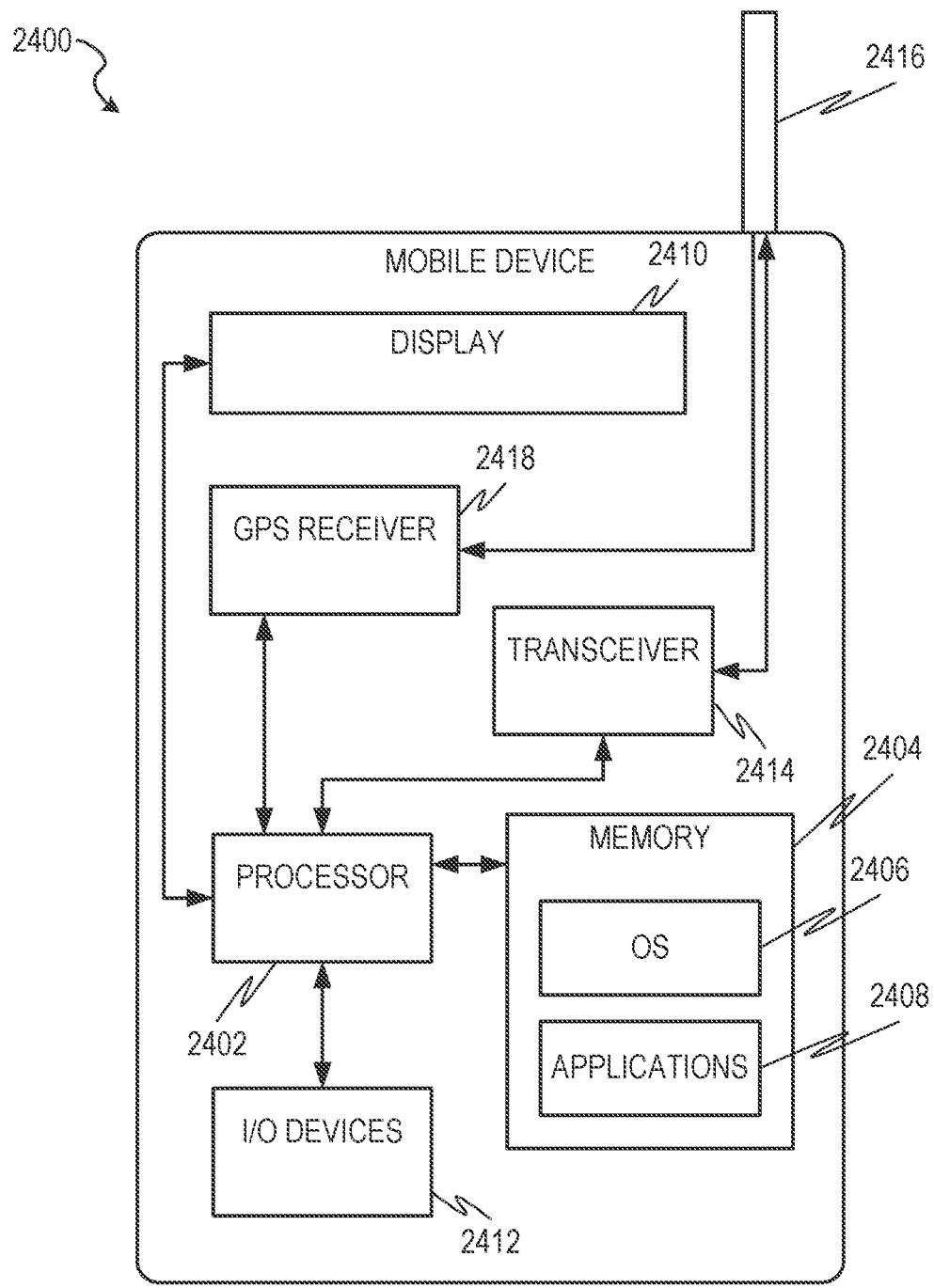
FIG. 24 is a block diagram illustrating a mobile device, in accordance with some example embodiments.

FIG. 24 is a block diagram illustrating a mobile device 2400, according to an example embodiment. The mobile device 2400 can include a processor 2402. The processor 2402 can be any of a variety of different types of commercially available processors suitable for mobile devices 2400 (for example, an XScale architecture microprocessor, a Microprocessor without Interlocked Pipeline Stages (MIPS) architecture processor, or another type of processor). A memory 2404, such as a random access memory (RAM), a Flash memory, or another type of memory, is typically accessible to the processor 2402. The memory 2404 can be adapted to store an operating system (OS) 2406, as well as application programs 2408, such as a mobile location-enabled application that can provide location-based services (LBSs) to a user. The processor 2402 can be coupled, either directly or via appropriate intermediary hardware, to a display 2410 and to one or more input/output (I/O) devices 2412, such as a keypad, a touch panel sensor, a microphone, and the like. Similarly, in some embodiments, the processor 2402 can be coupled to a transceiver 2414 that interfaces with an antenna 2416. The transceiver 2414 can be configured to both transmit and receive cellular network signals, wireless data signals, or other types of signals via the antenna 2416, depending on the nature of the mobile device 2400. Further, in some configurations, a GPS receiver 2418 can also make use of the antenna 2416 to receive GPS signals.

Modules, Components And Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Programming Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 25:
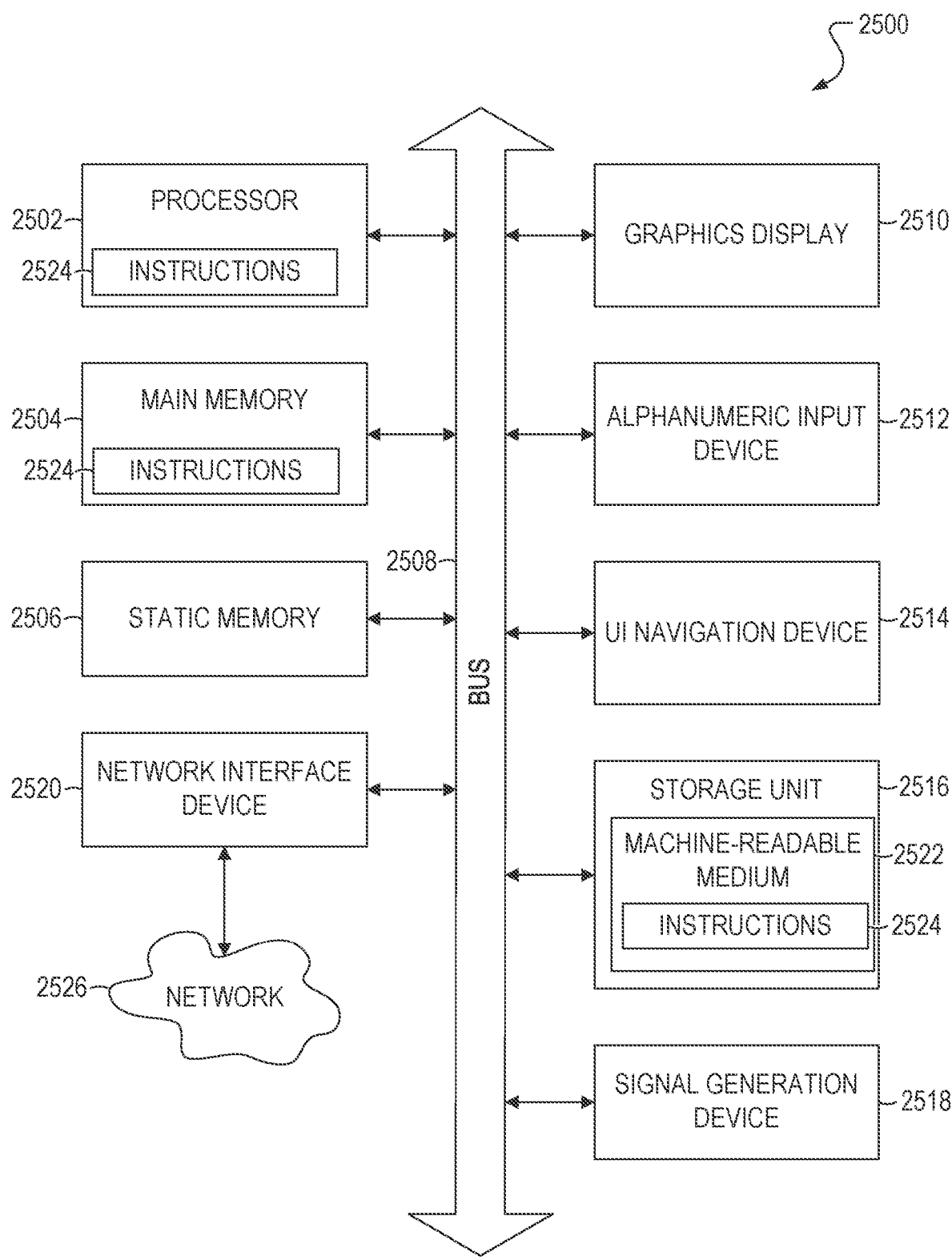
FIG. 25 is a diagrammatic representation of a machine in the form of a computer system within which a set of instructions may be executed for causing the machine to perform any one or more of the methodologies discussed herein, according to an example embodiment.

FIG. 25 is a block diagram of an example computer system 2500 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2506, which communicate with each other via a bus 2508. The computer system 2500 may further include a graphics display unit 2510 (e.g., a liquid crystal display (LCD) or a cathode ray tube (CRT)). The computer system 2500 also includes an alphanumeric input device 2512 (e.g., a keyboard or a touch-sensitive display screen), a user interface (UI) navigation device 2514 (e.g., a mouse), a storage unit 2516, a signal generation device 2518 (e.g., a speaker) and a network interface device 2520.

Machine-Readable Medium

The storage unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions 2524 or data structures. The term "machine-readable medium" shall also be taken to include any tangible medium that is capable of storing, encoding or carrying instructions (e.g., instructions 2524) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Executable Instructions and Machine-Storage Medium

The various memories (i.e., 2504, 2506, and/or memory of the processor(s) 2502) and/or storage unit 2516 may store one or more sets of instructions and data structures (e.g., software) 2524 embodying or utilized by any one or more of the methodologies or functions described herein. These instructions, when executed by processor(s) 2502 cause various operations to implement the disclosed embodiments.

As used herein, the terms "machine-storage medium," "device-storage medium," "computer-storage medium" (referred to collectively as "machine-storage medium 2522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 2522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 2522 specifically exclude carrier waves, modulated data signals, and other such media, at least some of which are covered under the term "signal medium" discussed below.

Signal Medium

The term "signal medium" or "transmission medium" in this disclosure shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

Numbered Examples of Embodiments

The following numbered examples are embodiments.

1. A computer-implemented method comprising:
    receiving, by a computer system having at least one hardware processor, a request for a transportation service associated with a place;
    retrieving, by the computer system, an entrance geographic location for the place from a database, the entrance geographic location being stored in association with the place in the database, and the entrance geographic location representing an entrance for accessing the place;
    generating, by the computer system, route information based on the retrieved entrance geographic location, the route information indicating a route from an origin geographic location of a computing device of a user to the entrance geographic location of the place; and
    causing, by the computer system, the generated route information to be displayed within a user interface on a computing device of the user.

2. The computer-implemented method of example 1, further comprising:
    detecting, by the computer system, that a current geographic location of the computing device of the user is within a predetermined distance of the entrance geographic location of the place; and
    causing, by the computer system, a visual representation of a structure within which the place is located to be highlighted within the user interface of the computing device in response to the detecting that the current geographic location of the computing device of the user is within a predetermined distance of the entrance geographic location.
3. The computer implemented method of example 2, wherein the causing the visual representation of the structure to be highlighted comprises applying a visual effect to an outline of the structure.
4. The computer-implemented method of any one of examples 1 to 3, further comprising:
detecting, by the computer system, that a current geographic location of the computing device of the user is within a predetermined distance of the entrance geographic location of the place; and
causing, by the computer system, a visual representation of at least one parking geographic location to be highlighted within the user interface of the computing device in response to the detecting that the current geographic location of the computing device of the user is within a predetermined distance of the entrance geographic location, the at least one parking geographic location being retrieved from the database and stored in association with the place in the database, and the at least one parking geographic location representing an area for parking a vehicle.
5. The computer-implemented method of any one of examples 1 to 4, further comprising:
detecting, by the computer system, that a current geographic location of the computing device of the user is within a predetermined distance of the entrance geographic location of the place; and
causing, by the computer system, a visual representation of the entrance to be highlighted within the user interface of the computing device in response to the detecting that the current geographic location of the computing device of the user is within a predetermined distance of the entrance geographic location.
6. The computer-implemented method of example 5, wherein the causing the visual representation of the entrance to be highlighted comprises applying a visual effect to the entrance.
7. The computer-implemented method of example 5 or example 6, wherein the causing the visual representation of the entrance to be highlighted comprises displaying an identifying label in association with the visual representation of the entrance within the user interface.
8. The computer-implemented method of any one of examples 1 to 7, wherein the place is a sub-unit of another place, and the computer-implemented method further comprises:
detecting, by the computer system, that a current geographic location of the computing device of the user is within a predetermined distance of the entrance geographic location of the place; and
causing, by the computer system, a visual representation of a rooftop geographic location of the place to be highlighted within the user interface of the computing device in response to the detecting that the current geographic location of the computing device of the user is within a predetermined distance of the entrance geographic location, the rooftop geographic location of the place representing a specific geographic location of the place within the other place.
9. The computer-implemented method of example 8, wherein the causing the visual representation of the rooftop geographic location to be highlighted comprises displaying an identifying label in association with the visual representation of the rooftop geographic location within the user interface.
10. The computer-implemented method of any one of examples 1 to 9, further comprising:
detecting, by the computer system, that a current geographic location of the computing device of the user is within a predetermined distance of the entrance geographic location of the place; and
causing, by the computer system, a visual representation of a path from an end of the route to the entrance to be displayed within the user interface of the computing device in response to the detecting that the current geographic location of the computing device of the user is within a predetermined distance of the entrance geographic location.
11. The computer-implemented method of any one of examples 1 to 10, further comprising:
detecting, by the computer system, that a current geographic location of the computing device of the user is within a predetermined distance of the entrance geographic location of the place; and
causing, by the computer system, one or more instructions for walking to the place to be displayed within the user interface of the computing device in response to the detecting that the current geographic location of the computing device of the user is within a predetermined distance of the entrance geographic location.
12. The computer-implemented method of any one of examples 1 to 11, further comprising:
detecting, by the computer system, that a current geographic location of the computing device of the user is within a predetermined distance of the entrance geographic location of the place; and
causing, by the computer system, at least one photographic image of the place to be displayed within the user interface of the computing device in response to the detecting that the current geographic location of the computing device of the user is within a predetermined distance of the entrance geographic location.
13. The computer-implemented method of any one of examples 1 to 12, wherein the transportation service comprises delivering one or more items to or from the place.
14. The computer-implemented method of any one of examples 1 to 13, further comprising:
accessing, by the computer system, corresponding sensor data for each one of a plurality of other requests for the transportation service associated with the place, the corresponding sensor data for each one of the plurality of other requests indicating a corresponding path of a mobile device of a corresponding provider of the transportation service for the one of the plurality of other requests; determining, by the computer system, the entrance geographic location for the place based on the sensor data for the plurality of other requests for the transportation service associated with the place; and storing, by the computer system, the entrance geographic location for the place in association with the place in the database.
15. The computer-implemented method of any one of examples 1 to 14, further comprising:
accessing, by the computer system, corresponding sensor data for each one of a plurality of other requests for the transportation service associated with the place, the corresponding sensor data for each one of the plurality of other requests indicating a corresponding path of a mobile device of a corresponding provider of the transportation service for the one of the plurality of other requests;

determining, by the computer system, the at least one parking geographic location for the place based on the sensor data for the plurality of other requests for the transportation service associated with the place; and storing, by the computer system, the at least one parking geographic location for the place in association with the place in the database.

16. A system comprising:

at least one hardware processor; and a machine-readable medium embodying a set of instructions that, when executed by the at least one hardware processor, cause the at least one hardware processor to perform the method of any one of examples 1 to 15.

17. A machine-readable medium embodying a set of instructions that, when executed by at least one hardware processor, cause the at least one hardware processor to perform the method of any one of examples 1 to 15.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

receiving, by a computer system having at least one hardware processor, a request for a transportation service associated with a place;

retrieving, by the computer system, an entrance geographic location for the place from a database, the entrance geographic location being stored in association with the place in the database, and the entrance geographic location representing an entrance for accessing the place;

generating, by the computer system, route information based on the retrieved entrance geographic location, the route information indicating a route from an origin geographic location of a computing device of a user to the entrance geographic location of the place;

causing, by the computer system, the generated route information to be displayed within a user interface on a computing device of the users;

detecting, by the computer system, that a current geographic location of the computing device of the user is within a predetermined distance of the entrance geographic location of the place; and in response to the detecting that the current geographic location of the computing device of the user is within the predetermined distance of the entrance geographic location:

causing, by the computer system, at least one photographic image of the place to be displayed within the user interface of the computing device;

causing, by the computer system, a visual representation of the entrance to be highlighted within the user interface of the computing device; and causing, by the computer system, an identifying label to be displayed in association with the visual representation of the entrance within the user interface.

2. The computer-implemented method of claim 1, further comprising:

causing, by the computer system, a visual representation of a structure within which the place is located to be highlighted within the user interface of the computing device in response to the detecting that the current geographic location of the computing device of the user is within the predetermined distance of the entrance geographic location.

3. The computer-implemented method of claim 2, wherein the causing the visual representation of the structure to be highlighted comprises applying a visual effect to an outline of the structure.

4. The computer-implemented method of claim 1, further comprising:

causing, by the computer system, a visual representation of at least one parking geographic location to be highlighted within the user interface of the computing device in response to the detecting that the current geographic location of the computing device of the user is within the predetermined distance of the entrance geographic location, the at least one parking geographic location being retrieved from the database and stored in association with the place in the database, and the at least one parking geographic location representing an area for parking a vehicle.

5. The computer-implemented method of claim 1, wherein the causing the visual representation of the entrance to be highlighted comprises applying a visual effect to the entrance.

6. The computer-implemented method of claim 1, wherein the place is a sub-unit of another place, and the computer-implemented method further comprises:

causing, by the computer system, a visual representation of a rooftop geographic location of the place to be highlighted within the user interface of the computing device in response to the detecting that the current geographic location of the computing device of the user is within a predetermined distance of the entrance geographic location, the rooftop geographic location of the place representing a specific geographic location of the place within the other place.

7. The computer-implemented method of claim 6, wherein the causing the visual representation of the rooftop geographic location to be highlighted comprises displaying an identifying label in association with the visual representation of the rooftop geographic location within the user interface.

8. The computer-implemented method of claim 1, further comprising:
causing, by the computer system, a visual representation of a path from an end of the route to the entrance to be displayed within the user interface of the computing device in response to the detecting that the current geographic location of the computing device of the user is within the predetermined distance of the entrance geographic location.

9. The computer-implemented method of claim 1, further comprising:
causing, by the computer system, one or more instructions for walking to the place to be displayed within the user interface of the computing device in response to the detecting that the current geographic location of the computing device of the user is within the predetermined distance of the entrance geographic location.

10. The computer-implemented method of claim 1, wherein the transportation service comprises delivering one or more items to or from the place.

11. The computer-implemented method of claim 1, further comprising:
accessing, by the computer system, corresponding sensor data for each one of a plurality of other requests for the transportation service associated with the place, the corresponding sensor data for each one of the plurality of other requests indicating a corresponding path of a mobile device of a corresponding provider of the transportation service for the one of the plurality of other requests;
determining, by the computer system, the entrance geographic location for the place based on the sensor data for the plurality of other requests for the transportation service associated with the place; and
storing, by the computer system, the entrance geographic location for the place in association with the place in the database.

12. The computer-implemented method of claim 1, further comprising:
accessing, by the computer system, corresponding sensor data for each one of a plurality of other requests for the transportation service associated with the place, the corresponding sensor data for each one of the plurality of other requests indicating a corresponding path of a mobile device of a corresponding provider of the transportation service for the one of the plurality of other requests;
determining, by the computer system, the at least one parking geographic location for the place based on the sensor data for the plurality of other requests for the transportation service associated with the place; and
storing, by the computer system, the at least one parking geographic location for the place in association with the place in the database.

13. A system comprising:
at least one hardware processor; and
a non-transitory machine-readable medium embodying a set of instructions that, when executed by the at least one hardware processor, cause the at least one hardware processor to perform operations, the operations comprising:
receiving a request for a transportation service associated with a place;
retrieving an entrance geographic location for the place from a database, the entrance geographic location being stored in association with the place in the database, and the entrance geographic location representing an entrance for accessing the place;
generating route information based on the retrieved entrance geographic location, the route information indicating a route from an origin geographic location of a computing device of a user to the entrance geographic location of the place;
causing the generated route information to be displayed within a user interface on a computing device of the user;
detecting that a current geographic location of the computing device of the user is within a predetermined distance of the entrance geographic location of the place; and
in response to the detecting that the current geographic location of the computing device of the user is within the predetermined distance of the entrance geographic location:
causing at least one photographic image of the place to be displayed within the user interface of the computing device;
causing a visual representation of the entrance to be highlighted within the user interface of the computing device; and
causing an identifying label to be displayed in association with the visual representation of the entrance within the user interface.

14. The system of claim 13, wherein the operations further comprise:
causing a visual representation of a structure within which the place is located to be highlighted within the user interface of the computing device in response to the detecting that the current geographic location of the computing device of the user is within the predetermined distance of the entrance geographic location.

15. The system of claim 14, wherein the causing the visual representation of the structure to be highlighted comprises applying a visual effect to an outline of the structure.

16. The system of claim 13, wherein the operations further comprise:
causing a visual representation of at least one parking geographic location to be highlighted within the user interface of the computing device in response to the detecting that the current geographic location of the computing device of the user is within the predetermined distance of the entrance geographic location, the at least one parking geographic location being retrieved from the database and stored in association with the place in the database, and the at least one parking geographic location representing an area for parking a vehicle.

17. A non-transitory machine-readable medium embodying a set of instructions that, when executed by at least one hardware processor, cause the at least one hardware processor to perform operations, the operations comprising:
receiving a request for a transportation service associated with a place;
retrieving an entrance geographic location for the place from a database, the entrance geographic location being stored in association with the place in the database, and the entrance geographic location representing an entrance for accessing the place;
generating route information based on the retrieved entrance geographic location, the route information indicating a route from an origin geographic location of a computing device of a user to the entrance geographic location of the place;

causing the generated route information to be displayed within a user interface on a computing device of the user;

detecting that a current geographic location of the computing device of the user is within a predetermined distance of the entrance geographic location of the place; and in response to the detecting that the current geographic location of the computing device of the user is within the predetermined distance of the entrance geographic location:

causing at least one photographic image of the place to be displayed within the user interface of the computing device;

causing a visual representation of the entrance to be highlighted within the user interface of the computing device; and causing an identifying label to be displayed in association with the visual representation of the entrance within the user interface.

\* \* \* \* \*